US012359891B2

(12) United States Patent
Price

(10) Patent No.: US 12,359,891 B2
(45) Date of Patent: Jul. 15, 2025

(54) ADJUSTABLE CLIP SYSTEM FOR HOLSTERS AND SHEATHS

(71) Applicant: Richard J. Price, Fort Meyers, FL (US)

(72) Inventor: Richard J. Price, Fort Meyers, FL (US)

( * ) Notice: Subject to any disclaimer, the term of this patent is extended or adjusted under 35 U.S.C. 154(b) by 338 days.

(21) Appl. No.: 18/171,492

(22) Filed: Feb. 20, 2023

(65) Prior Publication Data

US 2024/0003657 A1 Jan. 4, 2024

Related U.S. Application Data

(63) Continuation-in-part of application No. 17/856,319, filed on Jul. 1, 2022, now Pat. No. 11,885,590.

(51) Int. Cl.

| | |
|---|---|
| ***F41C 33/04*** | (2006.01) |
| *B26B 29/02* | (2006.01) |
| *F42B 39/02* | (2006.01) |

(52) U.S. Cl.

CPC .......... *F41C 33/041* (2013.01); *F41C 33/048* (2013.01); *B26B 29/025* (2013.01); *F42B 39/02* (2013.01)

(58) Field of Classification Search

CPC .. F41C 33/041; F41C 33/0236; F41C 33/048; F41C 33/043; A45F 5/02; A45F 5/021

See application file for complete search history.

(56) References Cited

U.S. PATENT DOCUMENTS

| | | | | |
|---|---|---|---|---|
| 5,112,178 | A * | 5/1992 | Overhues | F16B 39/24<br>267/161 |
| 8,789,306 | B1 * | 7/2014 | Mazzoni | F41C 33/04<br>42/71.01 |
| 10,209,032 | B1 * | 2/2019 | Aguirre | F41C 33/0236 |
| 2009/0001117 | A1 * | 1/2009 | Rassias | F41G 11/001<br>224/192 |
| 2016/0370144 | A1 * | 12/2016 | Laemmlen | H04B 1/3888 |
| 2018/0010885 | A1 * | 1/2018 | Tedder | F41C 33/0209 |
| 2022/0011073 | A1 * | 1/2022 | Clawson | F41C 33/041 |
| 2022/0089239 | A1 * | 3/2022 | Schepers | B62J 9/27 |

* cited by examiner

*Primary Examiner* — Corey N Skurdal

(57) ABSTRACT

The invention relates to an adjustable clip system primarily for use with sheaths, holsters, and/or holster rigs that attach to a user's belt or waistband or pocket via one or more clips. The adjustable clip system allows a user to independently adjust the height of the sheath, holster, or holster rig without requiring the user to raise, lower, or otherwise adjust the user's belt, waistband, pocket, clothing, and/or other attachment point to adjust the height of the sheath, holster, or holster rig.

20 Claims, 20 Drawing Sheets

ADJUSTABLE CLIP SYSTEM FOR HOLSTERS AND SHEATHS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks are used in the disclosure of the invention, and the applicants, make no claim to any trademarks referenced.

CROSS-REFERENCE TO RELATED APPLICATIONS

This application is a Continuation-In-Part Utility Patent application claiming priority to U.S. patent application Ser. No. 17/856,319, filed on Jul. 1, 2022, which is incorporated by reference herein in its entirety.

BACKGROUND OF THE INVENTION

1) Field of the Invention

The present invention relates to the field of holsters and sheaths used for carrying tools, handguns, knives, handheld weapons, Taser® and defense tools, and more specifically, the present invention relates to an adjustable clip system that allows the height and position of a holster or holster rig to be independently adjusted in relation to a wearer's waistband, belt, or pocket.

2) Description of Related Art

Currently the state of the art includes various holsters and sheaths designed to carry tools and weapons such as a handgun, knife, handheld weapon, defense tool, and Taser® non-lethal handheld weapon.

A holster is a device that is most commonly used to hold or restrict the undesired movement of a handgun or handheld weapon in a location where the handheld weapon may be accessible for use. As used in the art, holsters are often attached to a belt or waistband and generally designed to offer protection to the handheld weapon, secure its retention, and provide ready access to it.

The need for ready access to a handgun or handheld weapon is often at odds with keeping the handgun or handheld weapon concealed while also maintaining the comfort of the wearer. For example, many individuals use inside the waistband (IWB) holsters, which clip or mount to a belt or pants. A variant design of the IWB is an appendix inside the waistband (AIWB) holster, intended to allow a holster to be worn inside the front of the pants as opposed to the side or rear of the waistband. Appendix rigs are a variant design of AIWB holsters and have an attached magazine holder and/or other attached accessories. A second-conjoined holster such as that for a magazine is commonly referred to as a "sidecar holster". Many conventional appendix and other styles of holsters are modular in design, thereby allowing a rig to be customized by the intended user.

Current licensing laws adopted by many states require an individual carrying a handheld weapon to maintain concealment of the handheld weapon. Because of the nature of existing holsters, this can be cumbersome. Concealed carry is a common practice for investigators, law enforcement, security, and law-abiding citizens. Such tools can be worn/carried on- or off-person. On-person carry is the preferred method for the purpose of access, accountability, and retention. The most popular styles for concealed carry include those of IWB. Among those styles, one of the most common and increasingly popular is AIWB.

In general, carrying a tool in concealment maintains a level of discomfort in regard to wearing the tool and its limitations on performing day-to-day tasks. This is due to a combination of factors such as the weight, size, shape, and orientation of the tool being carried in concealment and its physical impediment on the user's range of motion and comfort. This is particularly the case when such tools are worn AIWB. Having a tool in your waistband acts as an obstacle to effective hip flexion and/or bending. It is not to say that the wearer of a holster is not physically capable of achieving a normal range of motion associated with day-to-day tasks while in the use of ordinary holsters. However, when worn properly, the present invention acts to increase the comfort of the use of such holsters or sheaths when performing activities.

Many conventional holsters, such as AIWB holsters, share the same drawbacks. For example, it is necessary to adjust and/or reposition holsters, such as appendix holsters or appendix rigs, side holsters, pocket holsters, and so forth prior to sitting down. This is necessary to maintain safe access to the handgun and/or other items being carried.

If the holster or rig is not pulled upward and/or repositioned prior to sitting, then the holster and handgun are forced into an angled position on the wearer's body, thereby limiting ready access to the handgun and/or other items being carried.

For example, to avoid this with an appendix carry holster, a wearer must pull or adjust the wearer's waistband and belt simultaneously with the attached holster and handgun or handheld weapon upward over the wearer's navel, so the handgun is positioned superiorly on the abdomen while sitting, bending, or squatting. This can be a difficult and uncomfortable task to accomplish.

Therefore, a need exists for an adjustable clip system that allows a height and position of a holster and/or holster rig to be independently adjusted in relation to a wearer's waistband, belt, pocket, or other attachment point.

BRIEF SUMMARY OF THE INVENTION

The instant invention in one form is directed to an adjustable clip system that allows a height of a sheath, holster, or holster rig to be independently adjusted in relation to a wearer's waistband, belt, pocket, or other attachment point.

The present invention achieves the above and other objects by providing an adjustable clip system primarily for use with holsters or holster rigs wherein the adjustable clip system provides a channeled member which is preferably a channeled plate that attaches to a holster and/or holster rig in respective fixed positions. A belt clip is slidably attached to the channeled plate using at least one compressible spacer, such as a spring, a rubber non-slip washer, or equivalent, and at least one stud that engages a vertical channel. The at least one compressible spacer remains in an expanded state when resting, thereby locking the channeled plate and respective clip together.

Non-slip or textured surfaces, such as interlocking ridges or locking notches, may be located on a rear surface of each channeled plate and/or the rear surface of the clip to allow the surfaces to interlock with each other when pressed together by the at least one compressible spacer or spring. Preferably, the compressible spacer or spring provides enough force and friction wherein a non-slip or textured surface is not necessary.

The device may be adjusted by applying sufficient force by means of pressing or lifting the channeled plate and/or holster/rig attached to the channeled plate in a parallel fashion in orientation to the clip to overcome the force applied by the compressive spacer(s). Compressive force can be applied directly to the clips to aid in minimizing the engagement of the compressive spacer(s), resulting in disengagement of the channeled plate. Each individual channeled plate enables the mounted side to translate along the length of the respective channel. This allows the holster and/or rig to be carried and for a wearer to make dynamic intermediate adjustments for comfort. Ultimately, the wearer is enabled to adjust the height of the holster and/or holster rig while sitting or standing without being required to adjust the height of the wearer's pants, reposition clothing, or loosen and re-tighten clip mounting fasteners.

One aspect of the present invention is directed to an adjustable clip system securable to a sheath, holster, or holster rig for allowing a height of the holster to be adjusted in relation to a fixed attachment point on a wearer. The adjustable clip system includes a channeled plate having a first vertical slot and a second vertical slot parallel to the first vertical slot wherein the channeled plate is attachable to the holster. The adjustable clip system includes at least one fastener extending through the first vertical slot and secured to an opening in the holster for securing the channeled plate to the holster. The adjustable clip system includes at least one U-shaped clip being slidably attached to the at least one second vertical slot to allow said U-shaped clip to slide in an upward direction and a downward direction in relation to at least one second vertical slot, said U-shaped clip remaining stationary with respect to the wearer. The holster may be a holster rig. The holster may be a sheath. The channeled plate may be adjustably attachable to the holster. The adjustable clip system may include at least one stud retaining at least one compressible spacer for slidably attaching said U-shaped clip to said second vertical slot. The at least one compressible spacer may be a spring or a rubber washer.

Another aspect of the present invention is directed to an adjustable clip kit for a sheath, holster, or holster rig including at least one channeled plate, at least one stud or rivet, at least one compressible spacer, and at least one clip. In addition to the at least one stud or rivet, the kit may include at least one attachment fastener for attaching the channeled plate to the holster. The attachment fastener may be a screw, rivet, or any threaded fastener. The kit may include at least one channel bracket or surface mount channel bracket. An attachment fastener as described in any embodiment of the clip system described herein, is meant to describe a fastener which is used to secure components of the invention together without adjustments required after the initial set up of the clip system.

Another aspect of the present invention is directed to an adjustable clip system securable to a sheath, holster, or holster rig for allowing a height to be adjusted in relation to a fixed attachment point on a wearer. The adjustable clip system includes a channeled plate having a first vertical slot and a second vertical slot parallel to the first vertical slot wherein the channeled plate is attachable to the holster. The adjustable clip system includes at least one fastener extending through the first vertical slot and secured to an opening in the holster for securing the channeled plate to the holster. The adjustable clip system includes at least one U-shaped clip being slidably attached to the at least one second vertical slot to allow the U-shaped clip to slide in an upward direction and a downward direction in relation to the at least one second vertical slot, said U-shaped clip remaining stationary with respect to said wearer. The adjustable clip system includes at least one stud retaining at least one compressible spacer for slidably attaching said U-shaped clip to the second vertical slot. The adjustable clip system includes an adjustable torsion claw. A stud and compressible washer are used to slidably retain a tooth securing cap to a torsion adjustment bracket of the adjustable torsion claw. The tooth securing cap attaches a tooth cap to the torsion adjustment bracket. An attachment fastener is used to attach a mounting bracket of the adjustable torsion claw to the holster or holster rig. The torsion adjustment bracket and mounting bracket of the adjustable torsion claw are attached by a stud or threaded fastener through an opening in the torsion adjustment bracket and mounting bracket.

Another aspect of the present invention is directed to a method for installing an adjustable clip system securable to a holster for allowing a height of the holster to be adjusted in relation to a fixed attachment point on a wearer. The method includes providing a holster and ensuring the holster has an elongated slot disposed vertically on a portion of the holster. The method includes providing a U-shaped clip, the U-shaped clip having a mounting portion with a clip mounting opening. The method includes providing a fastener having a stud portion with a first stud end and a second stud end opposite the first stud end. The fastener has a head portion removably attachable to the stud first end and a base portion attached to the stud second end. The method includes providing a compressible spacer, ensuring the fastener head has been removed from the fastener stud and extending the first end of the fastener stud through the compressible spacer until the fastener base portion contacts the compressible spacer. The method includes extending the first end of the fastener stud through the holster slot until the compressible spacer contacts the holster, extending the first end of the fastener stud through the clip mounting opening and engaging the fastener head to the first stud end. The method includes tightening the fastener head onto the stud first end, securing the U-shaped clip to the wearer's desired point of attachment and adjusting the holster in an upward or downward direction. The fastener head can be adjusted to increase or decrease compression to add or remove resistance for sliding of the stud and clip along the slotted channel. The holster may be a holster rig. The holster may be a sheath. In an alternate embodiment a kit includes the U-shaped clip, the fastener, the compressible washer, and a set of instruction for implementing the method for installing the adjustable clip system. The method is effectively achieved through reversing the placement of the stud first end, whereas the fastener head is removed from the fastener stud first end. The fastener stud first end is extended through the clip mounting opening of the clip until the fastener base portion engages the clip mounting base. The fastener stud first end is extended through the vertical slot in the holster. The fastener stud first end is extended through the compression washer. The fastener head is applied and tightened to add or reduce the compression of the compressible washer against the inside surface of the vertical slot in the holster. The user may then don the holster by attaching the U-shaped clips to the user's desired attachment point and adjust the holster up or down along the length of the vertical slots to the functional position of comfort.

The use of the term "vertical slot" may be used interchangeably with the term "opening" when specifically applied to the channeled member. The use of the vertical slot as the opening in the channeled member is the preferred embodiment. Alternative forms of the opening may exist to facilitate various patterns for attachment to holsters, holster rigs, and sheaths maintaining different attachment footprints.

The above and other objects, features, and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
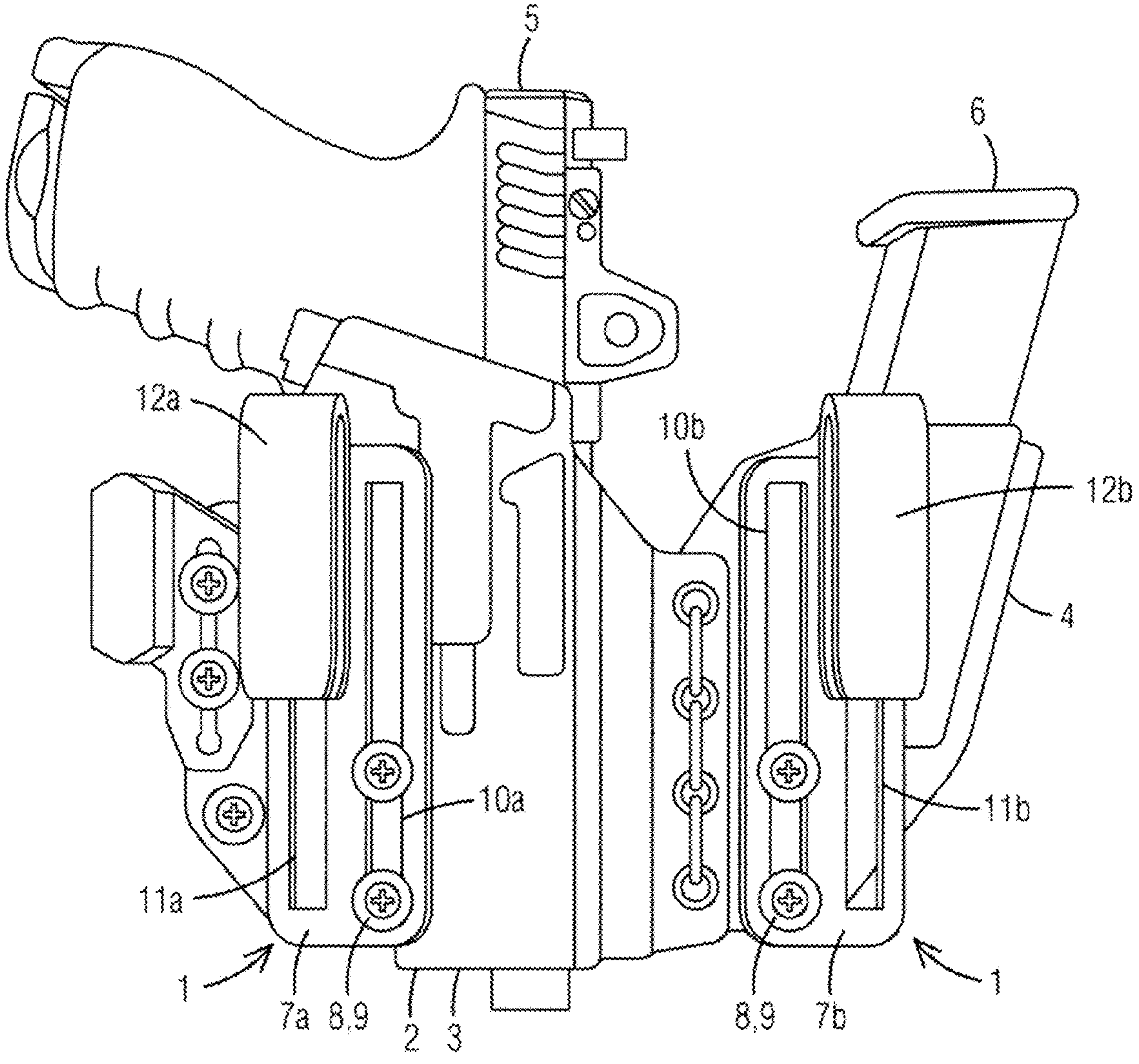
FIG. 1 is a front view of an appendix carry holster rig having an adjustable clip system of the present invention mounted thereto wherein the holster rig is in a lowered position.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B, or C" or "A, B, and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms handguns, knives, handheld weapon, defense tools, and a Taser© non-lethal handheld weapon are used interchangeably to mean a handheld weapon used with a holster of the instant invention.

The term holster as used in the specification is intended to describe either a holder for a tool/weapon or a sheath for a handheld weapon that is worn by a user of the handheld weapon.

Prior to a discussion of the preferred embodiment of the invention, it should be understood that the features and advantages of the invention are illustrated in terms of a holster which is enabled to be adjusted while being worn by a user thereby eliminating the handheld device and holster from being an obstacle to effective hip flexion and/or forward bending.

The instant invention provides for a channel that spans the full-length of adjustment that is associated with a dynamically or slidably adjustable clip system. The instant invention further envisions integrating into a holster a device using a single-permanent channel as opposed to a bracket.

The instant invention may be used for investigators, law enforcement, security, and law-abiding citizens; and provides a means for moving an attached holster or sheath carried in concealment along the axis of a slotted channel without having to remove the object, and/or adjust any permanent means of attachment to achieve such adjustment.

The instant invention provides the user with a comfortable holster by replacing standard attachment clips (i.e., belt clips) commonly found on a tool holster/sheath, which may be attached to a backpack, pocket, belt (most common), or otherwise point of attachment with the clip-on-channel system of the instant invention. Concisely, the clip is attached to a channel by one or more adjustable studs with one or more compressible washers/spacers. The clip, attached by the studs, is able to translate along a channel, and translate the length of said channel. The compressible washers/spacers that are attached to the studs are positioned adjacent the channel, creating drag or friction against the surrounding surface of the channel. If the stud is a rivet, the spacer is positioned between the rivet head and the channel. The spacer may also be positioned between the rivet cap and the channel. The resistance caused by the contact of the compressible washers/spacers fixes the clip in place until otherwise acted on with sufficient force to once again move the clip along the channel.

Currently, there are no similar products that work by adjusting a concealed handgun, knife, or otherwise on a user while the item remains attached. This is important for the wearer because the statues for concealed carry often stipulate that the wearer must keep the weapon concealed at all times. The instant invention can allow the wearer to keep the weapon concealed both when standing and seated. Similar products require the user to remove the holster, unscrew the studs, move the clip, and once again tighten the screws to fix the clip in a single orientation. Other products allow for outside the waistband holsters to be vertically adjusted and use a much more complex mechanism that permanently locks a firearm holster in a single position until an actuator is actively engaged by the user. Outside the waistband holsters (i.e., holsters for competitions or duty holsters) do not allow for free-dynamic adjustment or concealed options.

The instant invention is a device which includes a clip attached to a slotted-channel integrated into a holster or sheath, allowing the clip to maneuver from one end-to the other of the channel without requiring permanent fixation in a single position; or as a clip attached to a slotted-channel that is part of a bracket, in which the bracket is attached to a holster or sheath, that allows the clip to maneuver from one end-to the other of the channeled bracket without requiring permanent fixation.

The instant invention is used by being manually manipulated by the user's hands while attached to an attachment point. The holster is attached by two clips. To elevate the holster from a fully tucked position in the user's waistband, the user is able to grasp the holster and use upward pressure on the holster while the clips remain attached to an attachment point. To lower the device, the process may be reversed by applying downward pressure to the top of the holster while the clips remain attached to an attachment point.

Furthermore, the instant invention solves the problem of reducing the limitations on range of motion and associated activities complicated by the use and application of holsters and sheaths. The adjustable clip system permits the user to make dynamic adjustments to the position of a tool/holster (or sheath) while the tool/holster (or sheath) remain securely attached to its attachment point (the user or user's accessory), while maintaining the integrity of concealment.

The adjustable clip system furthermore provides the ability for the user to achieve greater comfort when bending laterally or forwardly. A common complaint among users is that the holster for the handheld weapon is uncomfortable and makes it difficult to wear. The instant invention solves the problem by making the holster fully adjustable while the holster is being worn without having to remove the holster, handheld weapon/tool, and/or loosen the fasteners for readjustment and resecuring of the clip to the holster.

The first embodiment of the instant invention is a clip that is attached to a bracket and an adjustable torsion claw. The bracket is attachable to a holster or sheath. The bracket serves a dual purpose; 1) as a permanent point of attachment to the holster or sheath, and 2) as a channel for the clip to translate or slide from one end-to the other end of the bracket. The adjustable torsion claw serves a dual purpose; 1) as a permanent point of attachment to the holster or sheath, and 2) as a means to torque the holster or sheath into a wearer's waistline while accommodating for changes in a height and/or position of the holster. The second embodiment integrates a holster and a bracket into one, by simply creating a channel in the holster, and utilizing compressive spacers, studs, and a clip to translate from one end-to the other of the channel (meshed into the holster) while remaining attached to the user.

The instant invention comprises the following components:

a. a holster or holster rig;
b. at least one channeled bracket;
c. at least one fastener;
d. at least one compressible spacer;
e. at least one attachment fastener;
f. at least one clip; and
g. at least one adjustable torsion claw.

The assembly of all the items into a kit makes the installation simple and easy for the user since all the parts are included in the kit. The kit comprises:

a. at least one channeled bracket;
b. at least one fastener;
c. at least one compressible spacer;
d. at least one attachment fastener;
e. at least one clip;
f. an adjustable torsion claw; and
g. a set of instructions for using the kit.

The kit of the instant invention wherein the attachment fasteners are rivets or studs.

The instant invention is an adjustable clip system for holsters and holster rigs that allows a height of a holster or holster rig to be independently adjusted in relation to a fixed attachment point on a wearer, the adjustable clip system comprising:

a. at least one channeled bracket and the at least one channel bracket having at least one first vertical slot and at least one second vertical slot parallel to the at least one first vertical slot located thereon;
b. the at least one channeled bracket being attachable to an existing holster using at least one attachment fastener;
c. at least one U-shaped clip being slidably attached to the at least one second vertical slot to allow the U-shaped clip to slide up and down in relation to the at least one second vertical slot on the at least one channeled bracket while the U-shaped clip remains stationary with respect to the wearer;
d. the at least one adjustable fastener for slidably attaching the U-shaped clip to the slotted channel of the holster and/or channeled bracket; and
e. the at least one compressible spacer being attached to the holster and/or channeled bracket by the at least one adjustable fastener.

The adjustable clip system of the instant invention wherein: the at least one U-shaped clip is slidably attached to the at least one second vertical slot of the at least one channeled bracket via at least one stud that retains at least one compressible spacer.

The adjustable clip system of the instant invention wherein the at least one compressible spacer is a rubber washer.

Figure 2:
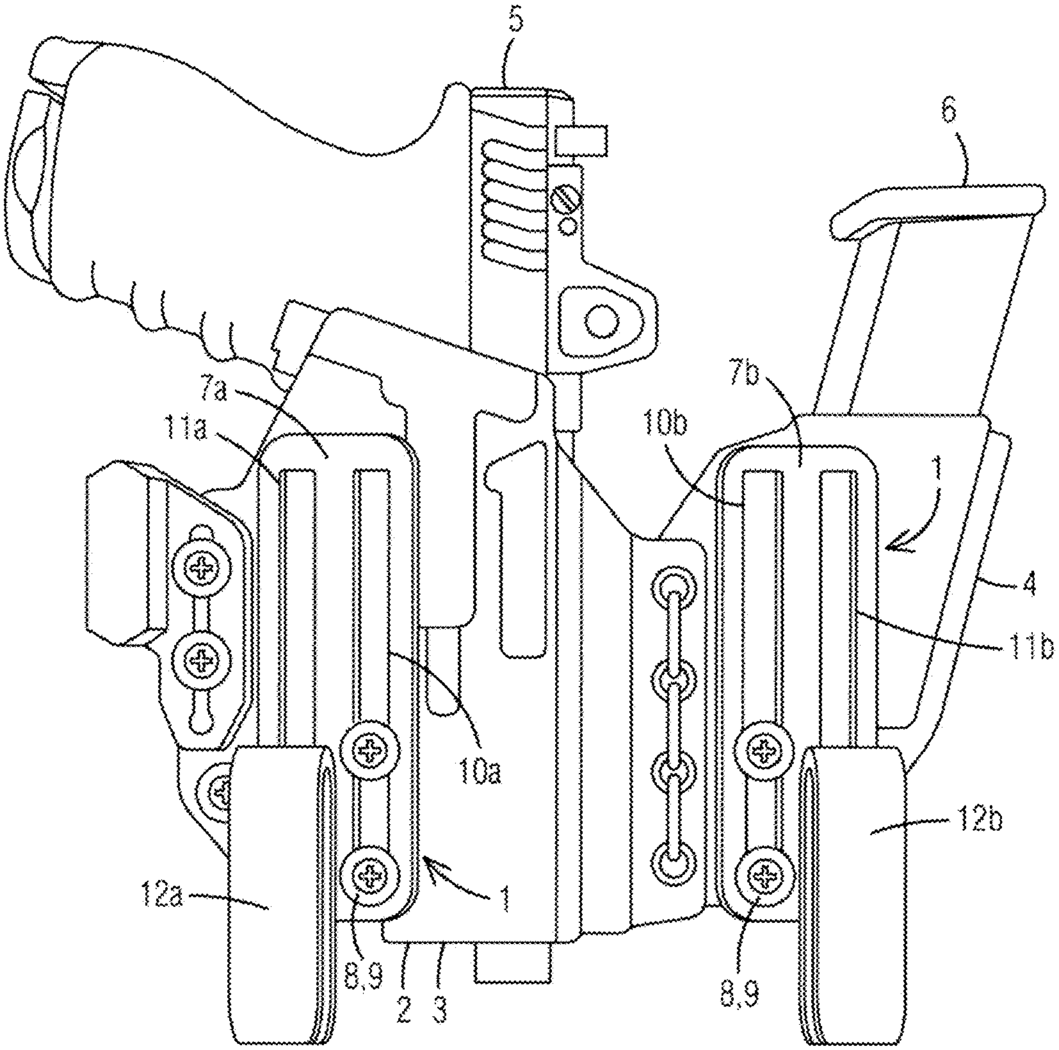
FIG. 2 is a front view of an appendix carry holster rig having an adjustable clip system of the present invention mounted thereto wherein the holster rig is in a raised position.

With general reference to FIGS. 1 and 2, front views of an appendix carry holster rig 2 having an adjustable clip system 1 of the present invention mounted thereto wherein the holster rig 2 is in a lowered position in FIG. 1 and in a raised position in FIG. 2 are illustrated. The appendix carry holster rig 2 comprises a holster 3 used for holding a handgun 5 attached to a magazine holder 4 used for carrying an extra magazine 6. As illustrated here, the adjustable clip system 1 comprises a first channeled member which is preferably a first channeled plate 7*a* and a second channeled member which is preferably a second channeled plate 7*b* that are attached to the holster 3 and magazine holder 4, respectively, at desired heights using a fastener such as screw 9, placed through a first opening which is preferably a first vertical channel 10*a* located on the first channeled plate 7*a* and a vertical opening which is preferably a first vertical channel 10*b* located on the second channeled plate 7*b*.

A second vertical channel 11*a* and a second vertical channel 11*b* are respectively located on the first channeled plate 7*a* and second channeled plate 7*b*. A first clip 12*a* and a second clip 12*b* are each slidably attached to the second vertical channel 11*a* and the second vertical channel 11*b*, respectively, via at least one stud 13 and at least one compressible spacer 14, such as a spring 15 or rubber washer, or equivalent as illustrated in FIGS. 5A and 5B. Each compressible spacer 14 is positioned in a manner to provide force on a channeled plate 7*a* or 7*b* and its respective clip 12*a* or 12*b* and further held in place by the at least one stud 13. The at least one compressible spacer 14 remains in an expanded state when resting, thereby preventing the clips 12*a* and 12*b* from sliding up and down in relation to their respective channeled plates 7*a* and 7*b*. A wearer may adjust the height of the holster rig 2 in relation to the clips 12*a* and 12*b* by manipulating and squeezing the at least one compressible spacer 14 which causes the channeled plates 7*a* and 7*b* to separate and disengage from the clips 12*a* and 12*b*, thereby allowing the holster rig 2 to slide up and down in relation to the clips 12*a* and 12*b* while the clips stay stationary on a waistband and/or belt, as illustrated in FIGS. 3 and 4.

Figure 3:
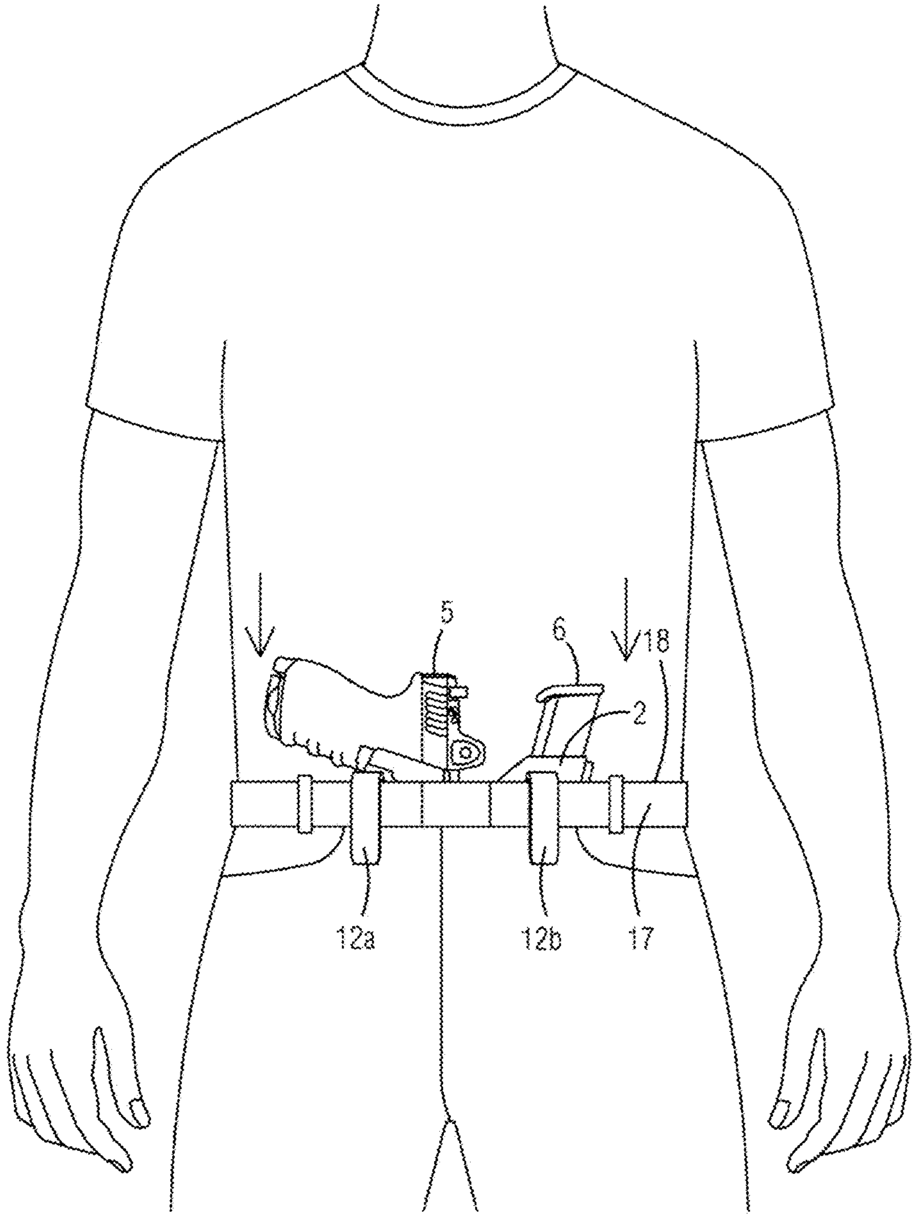
FIG. 3 is a front view of an appendix carry holster rig having an adjustable clip system of the present invention mounted thereto wherein the holster rig is in a lowered position on a wearer's waist and abdomen.
Figure 4:
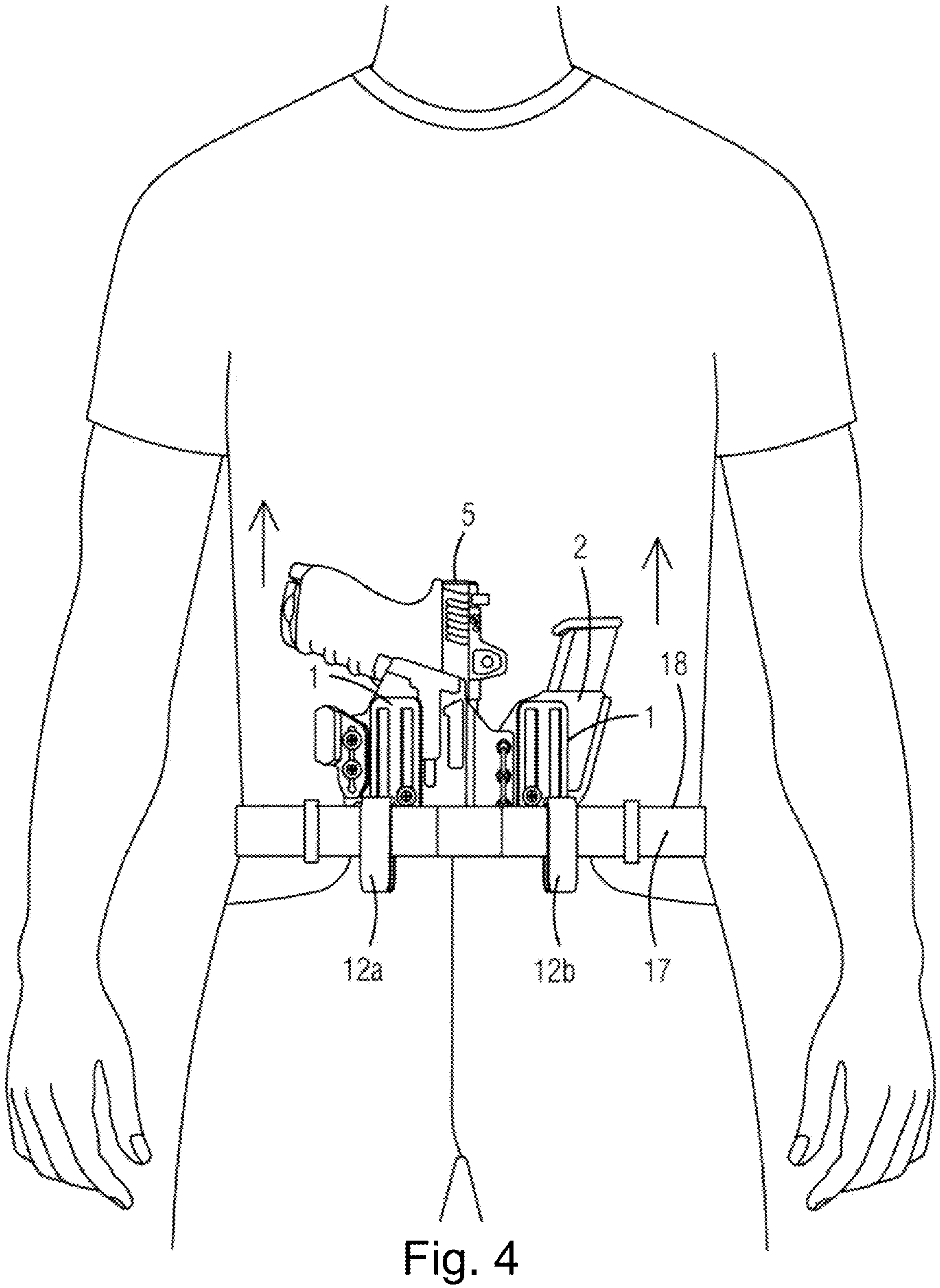
FIG. 4 is a front view of an appendix carry holster rig having an adjustable clip system of the present invention mounted thereto wherein the holster rig is in a raised position on a wearer's waist and abdomen.
Figure 5A:
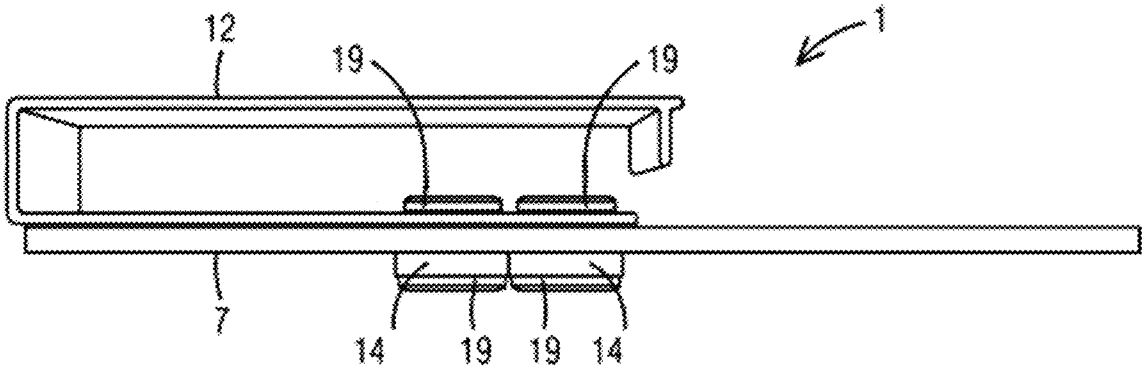
FIG. 5A is a side view of a clip, channeled plate, fastener, and compression washer of the adjustable clip system of the present invention.
Figure 5B:
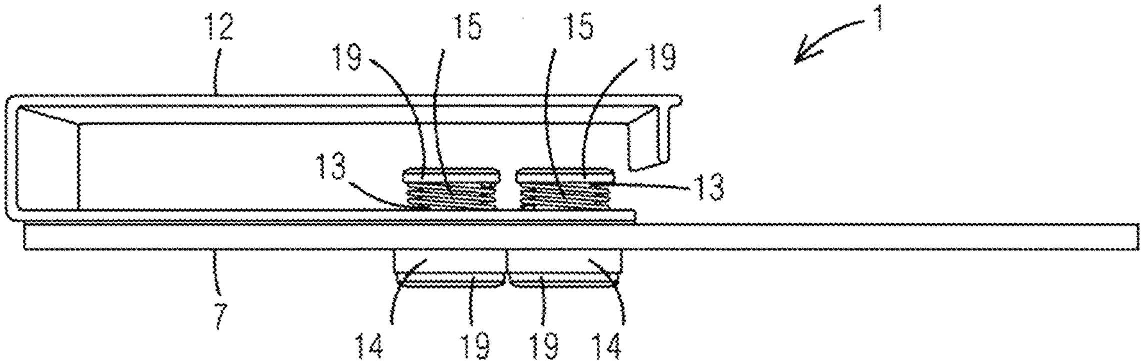
FIG. 5B is a side view of a clip, channeled plate, spring, fastener, and compression washer of the adjustable clip system of the present invention.

With reference to FIGS. 3 and 4, front views of an appendix carry holster rig 2 having an adjustable clip system 1 of the present invention mounted thereto and positioned at various heights on an individual's waist and abdomen are illustrated. As illustrated in FIG. 3, an individual is carrying the appendix carry holster rig 2 in a lowered position on the individual's belt 17 and waistband 18, which is a preferable position while standing or walking. In contrast, FIG. 4 illustrates the individual carrying the appendix carry holster rig 2 in a raised position on the individual's belt 17 and waistband 18, which is preferable while sitting or bending over. A wearer may adjust the height of the holster rig 2 in relation to the clips 12*a* and 12*b* by applying sufficient force by means of pressing or lifting one or both of the channeled plates 7*a* and 7*b* and/or holster rig 2 attached to the channeled plates 7*a* and 7*b* in a parallel fashion in orientation to the clips 12*a* and 12*b* to overcome the force applied by the compressive spacers 14. Compressive force can be applied directly to the clips 12*a* and 12*b* to aid in minimizing the engagement of the compressive spacers 14 with the channeled plates 7*a* and 7*b*. Each individual channeled plate 7*a* and 7*b* enables clips 12*a* and 12*b* to translate along the length of the respective channel 11.

Figure 6A:
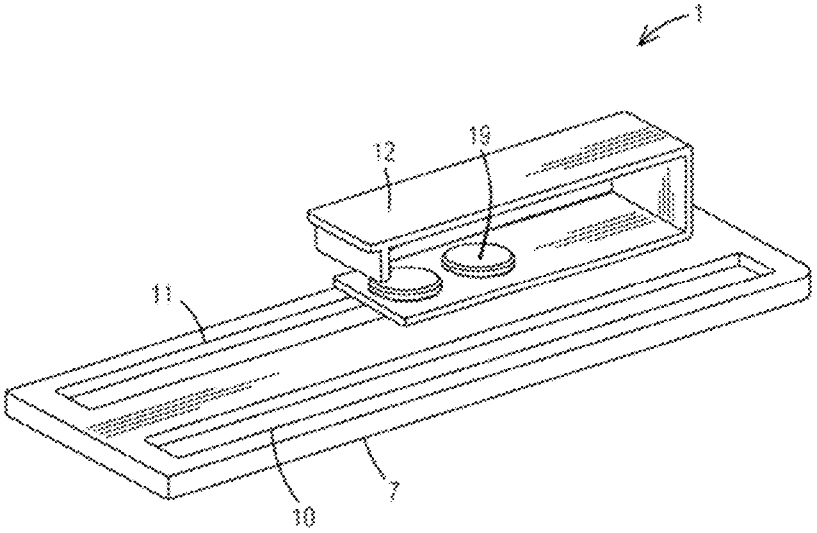
FIG. 6A is a perspective view of a clip, channeled plate, fastener, and compression washer of the adjustable clip system of the present invention.
Figure 6B:
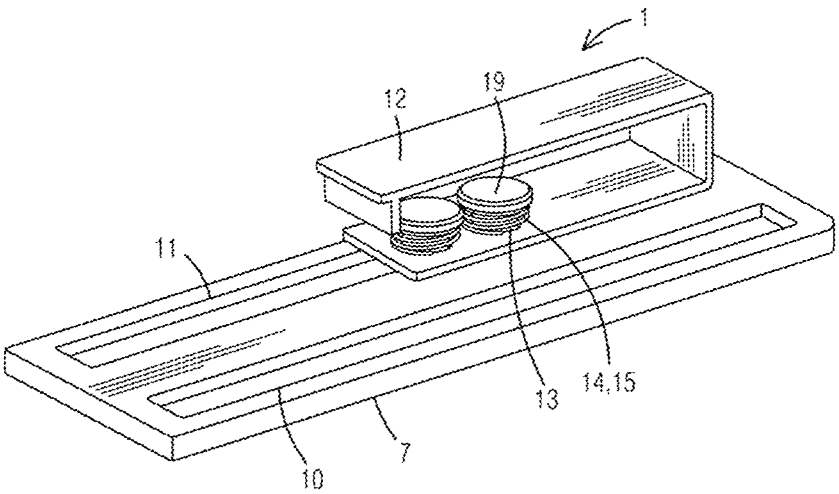
FIG. 6B is a perspective view of a clip, channeled plate, spring, fastener, and compression washer of the adjustable clip system of the present invention.
Figure 7:
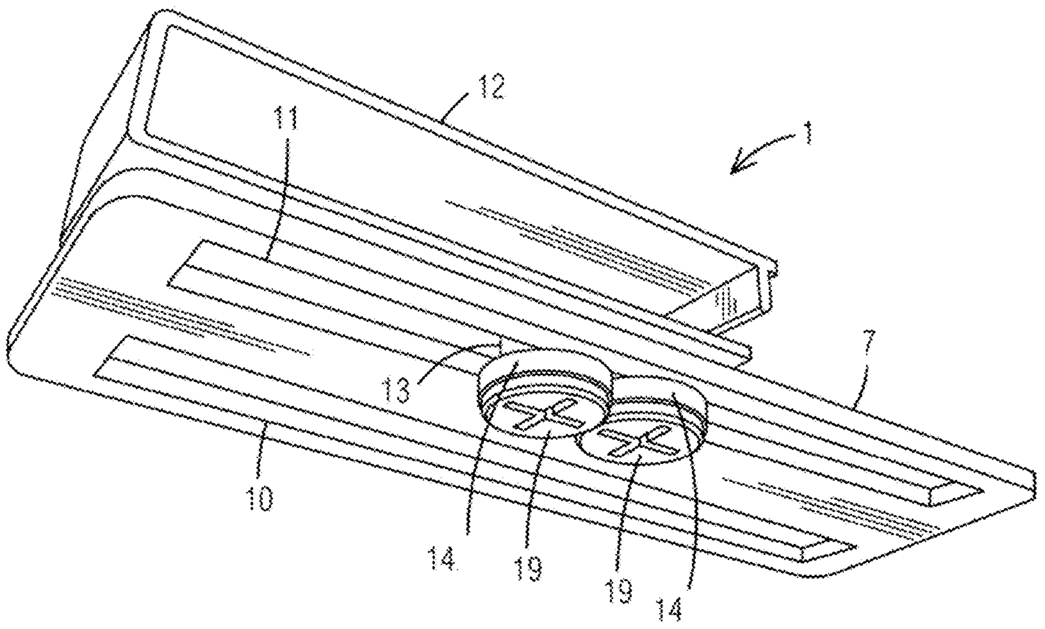
FIG. 7 is a bottom perspective view of a clip and channeled plate of the adjustable clip system of the present invention.

FIG. 5A is a side view of a clip, channeled plate, fastener, and compression washer of the adjustable clip system of the present invention. FIG. 5B is a side view of a clip, channeled plate, spring, fastener, and compression washer of the adjustable clip system of the present invention. FIG. 6A is a perspective view of a clip, channeled plate, fastener, and compression washer of the adjustable clip system of the present invention. FIG. 6B is a perspective view of a clip, channeled plate, spring, fastener, and compression washer of the adjustable clip system of the present invention. FIG. 7 is a bottom perspective view of the clip and channeled plate of the adjustable clip system.

Figure 23A:
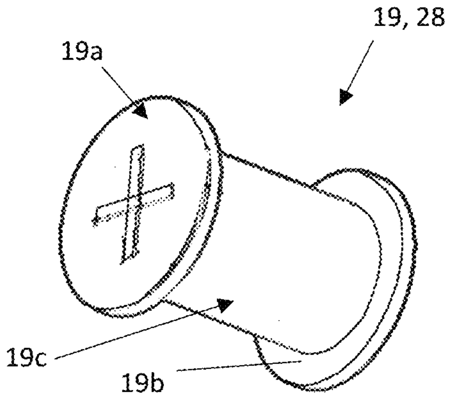
FIG. 23A shows a threaded fastener having a first flange portion engageable with a second flange portion.
Figure 23B:
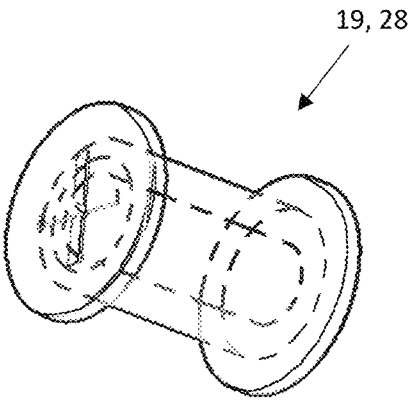
FIG. 23B shows the internal core portion of the threaded fastener shown in FIG. 23A.

FIGS. 23A and 23B show a threaded removable rivet 19, 28 having a rivet cap or first flange portion 19*b* engageable with a cylindrical rivet shank 19*c*. The cylindrical rivet pin or rivet shank 19*c* has a shank first end, a shank second end, and a shank flange or head 19*b* extending outwardly from the shank second end. The rivet cap 19*a* is engageable with the shank first end.

Figure 24:
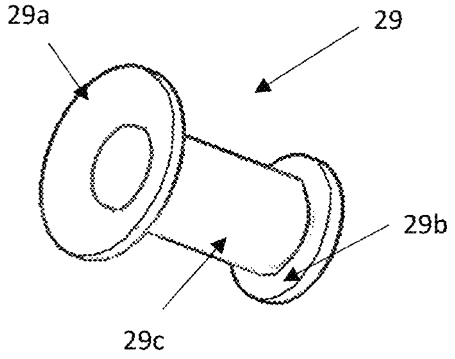
FIG. 24 shows a permanent rivet according to the present invention.

FIG. 24 shows a permanent rivet 29 having a pin or shank 29*c* and a rivet head 29*b*. The rivet cap 29*a* is permanently formed during installation of the permanent rivet 29. The permanent rivet 29 or the removable rivet 19, 28 may be used in any of the instances where the fastener or the attachment fastener is used. The rivet may also be a threaded rivet nut. In this application any of the rivets described above may be used as any of the fasteners found on the adjustable clip system.

The adjustable clip system allows a height of the sheath, holster, or the holster rig to be adjusted in relation to a fixed attachment point on a wearer. The system includes a clip 12 and a channeled plate 7. The channeled plate 7 may be rectangular-shaped or have any other suitable geometric shape, such as a polygon or hexagon, wherein the channeled plate 7 has a first vertical channel 10 and a second vertical channel 11 oriented parallel to each other. The clip 12 is preferably U-shaped and slidably attached to the second vertical channel 11 via at least one stud or rivet 13 having head 19*a* and head 19*b* on each respective end. Head 19*a* and/or 19*b* retain the at least one compressible spacer 14 (such as a spring 15, rubber washer, or equivalent), channeled plate 7, and clip 12 together. The channeled plate may maintain locking notches, textured surfaces, or non-slip ridges to temporarily fix the clip in place along the length of the slotted channel.

Figure 9:
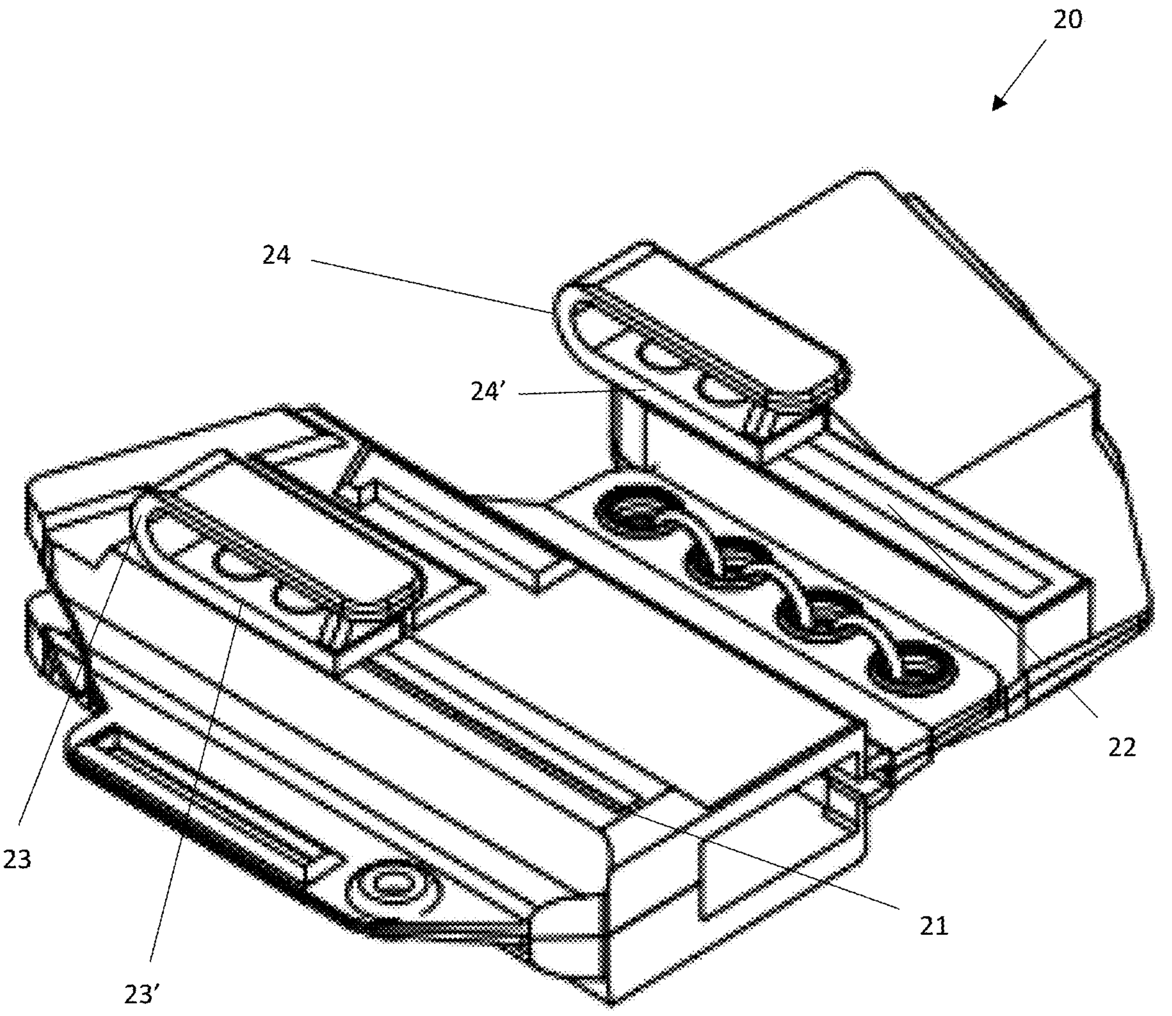
FIG. 9 there is shown a perspective front view of a second embodiment of the adjustable clip system having an integrated attachment channel wherein a slot is milled or integrated in the sheath, holster, or holster rig.

Referring to the drawings FIGS. 9-13, there is shown a second embodiment of the present invention. FIG. 9 shows a perspective view from the front side of a holster 20 showing a first holster channel 21 and second holster channel 22. The first holster channel 21 and second holster channel 22 may be milled into an existing holster or holster rig or may be manufactured with the first holster channel 21 and second holster channel 22 in the holster or holster rig. A first adjustable clip 23 is slidingly installed in first channel 21 and a second clip 24 is installed in second channel 22. The adjustable clip system is securable to a sheath or holster for allowing a height of the sheath or holster to be adjusted in relation to a fixed attachment point on a wearer. The adjustable clip system includes at least one clip 23, 24, at least one adjustable fastener 28, the adjustable fastener 28 preferably being a threaded rivet or removable rivet 19 (FIGS. 23A and 23B), comprising a first flange 19*b* having an integrated threaded cylinder 19*c* protruding therefrom and a second flange 19*a* engageable with the threaded cylinder 19*c*. The removable rivet 19 is considered an adjustment fastener 28. The fastener extends through a slot 21, 22 on the sheath or holster and through an opening on the clip 23, 24, for slidingly securing the clip to the sheath or holster. The adjustable clip system includes at least one compressible spacer 14 disposed between a first flange 19*b* or second flange 19*a* of the fastener and the surface of the sheath or holster adjacent the slot 21, 22. The at least one compressible spacer remains in an expanded state when resting, thereby locking the channeled plates and respective clips together.

The user of the holster 20 can adjust the height of the holster by grasping the base or other part of the holster and urging the holster in an upward or downward direction along the slotted channel integrated into the holster whereby the holster translates along the path of the slotted holster channel 21, 22. When urged, the holster may travel along the path of the slotted holster channel 21, 22 integrated into the holster.

Figure 10A:
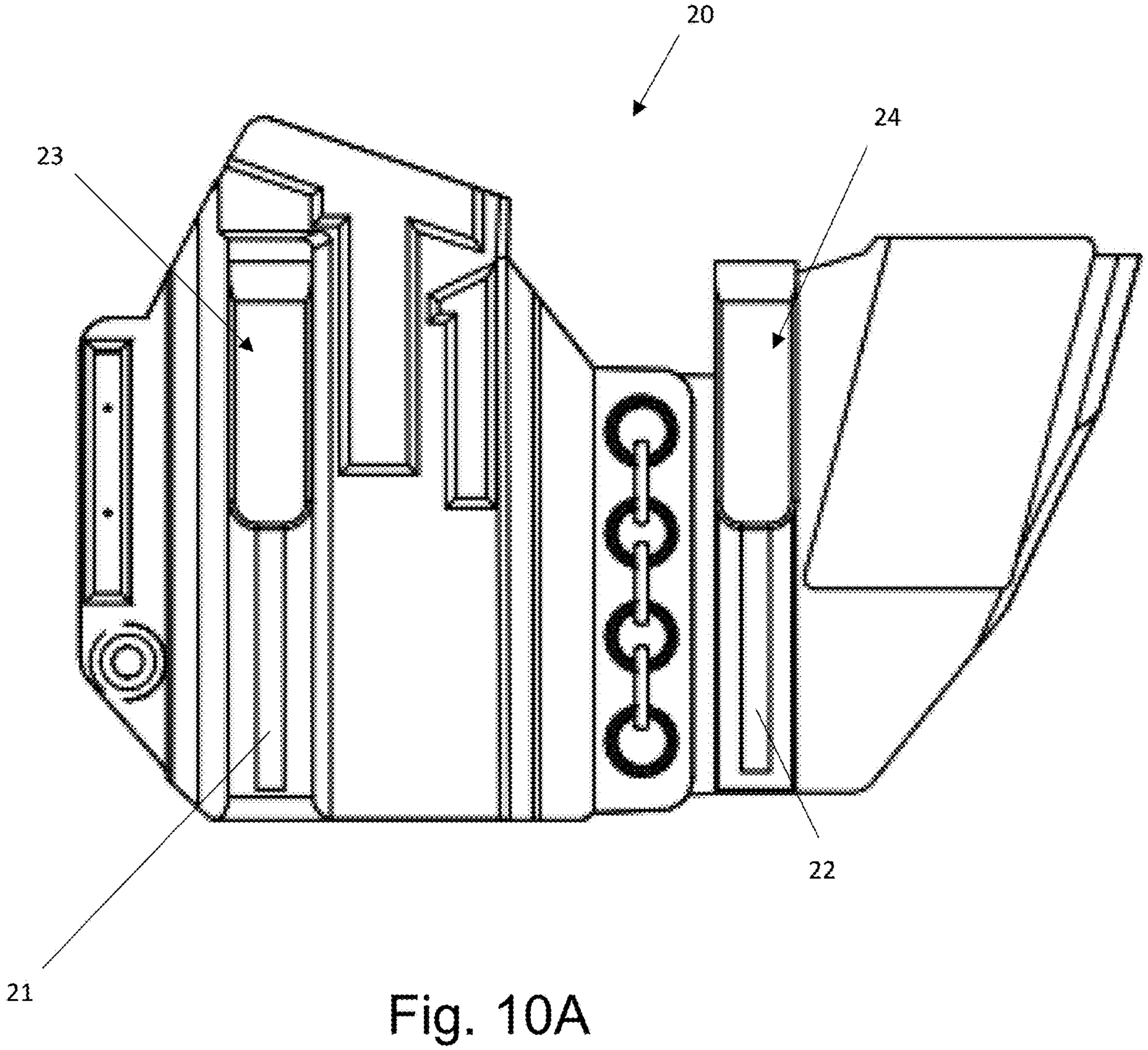
FIG. 10A there is shown a front view of the adjustable clip system shown in FIG. 9.
Figure 10B:
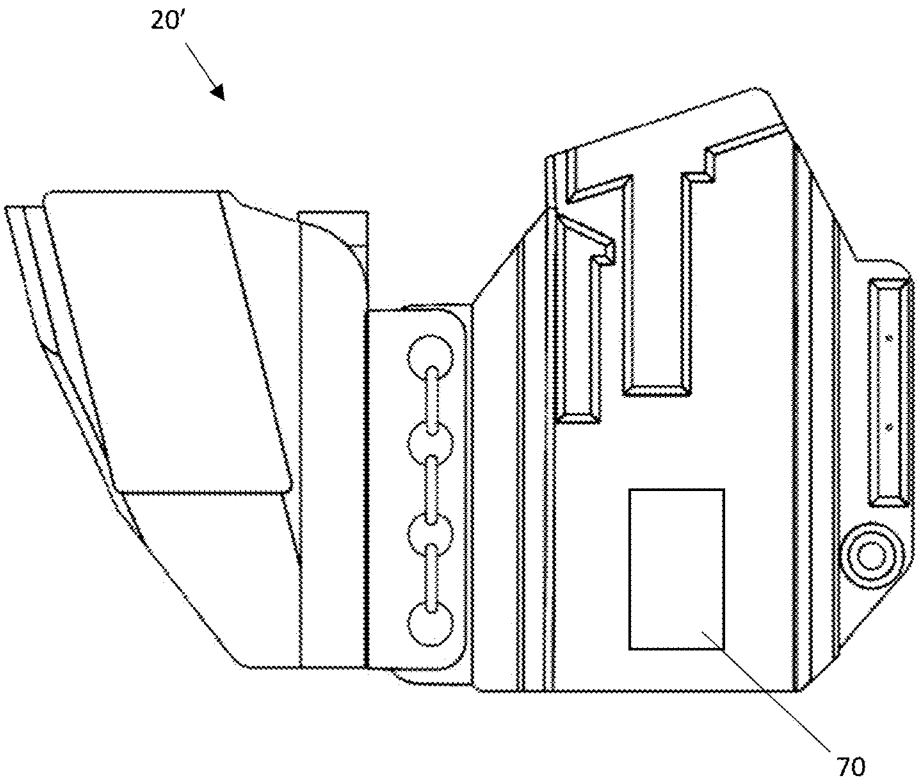
FIG. 10B there is shown a back view of an embodiment of the adjustable clip system having an electronic module.
Figure 10C:
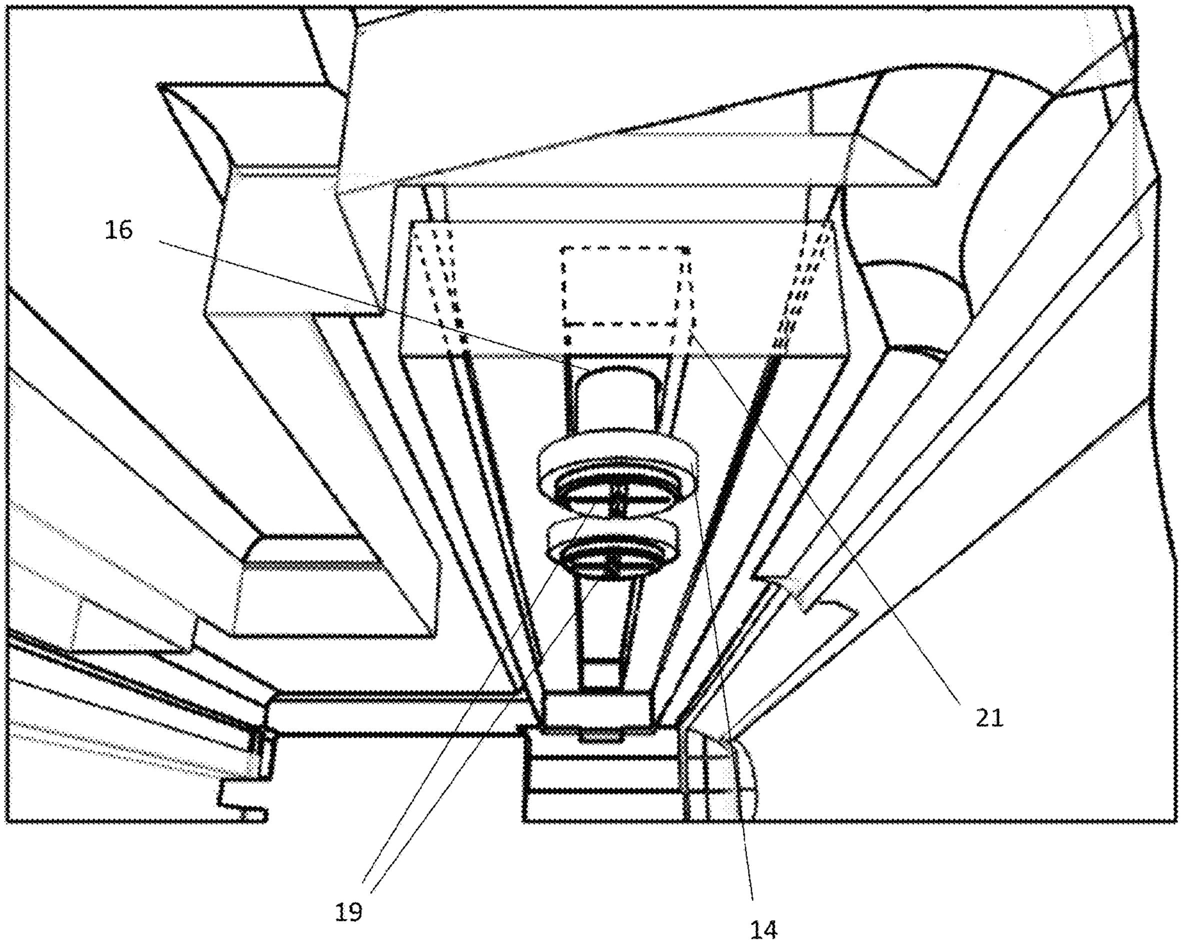
FIG. 10C there is shown an internal view of the monolithic channel of the front of the holster rig.
Figure 11:
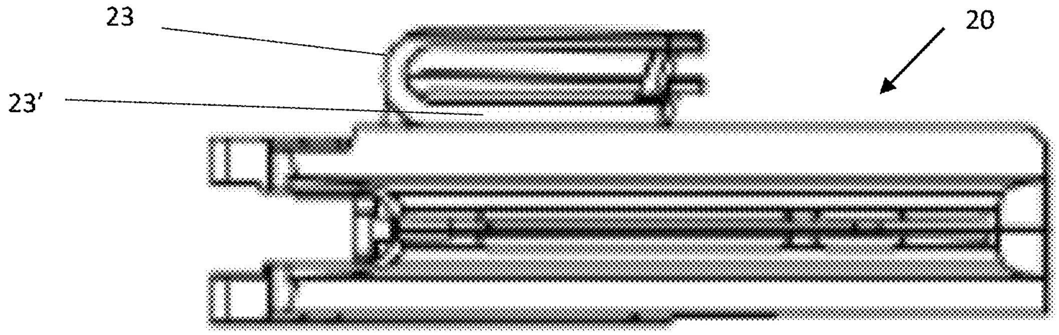
FIG. 11 is shown a right-side view of the holster shown in FIG. 9 showing first adjustable clip installed in the integrated holster channel.
Figure 12:
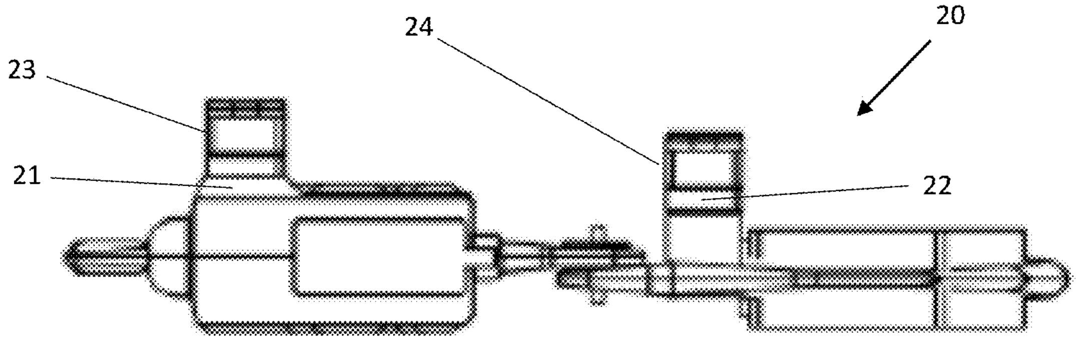
FIG. 12 is shown a bottom view of the holster shown in FIG. 9 showing the adjustable clips installed in the channels.
Figure 13:
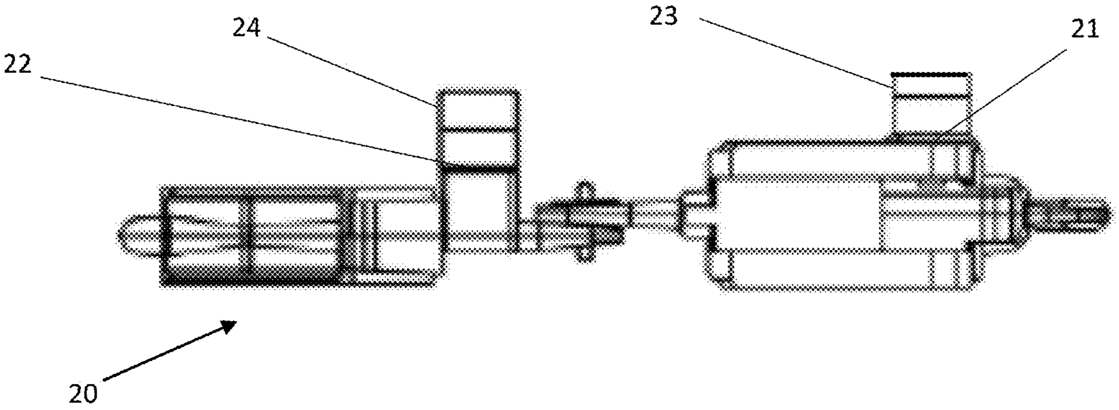
FIG. 13 is shown a top view of the holster shown in FIG. 9 showing the adjustable clips installed in the channels.

Holster 20 shown in FIG. 10A includes the first adjustable clip 23 which is installed in the first channel 21 and the second clip 24 which is installed in the second channel 22. FIG. 10B shows a rear view of a Holster 20' whereas an electronic module 70 may be installed in the holster and/or adjustable clip system for automating adjustments to the fasteners, compressible spacers, clips, and/or holster, and/or sending data to a device for diagnostics and technical monitoring by the user. FIG. 10C shows a perspective view of a portion of the holster including the first channel 21. Referring to FIG. 11 is shown a right-side view of the holster 20 showing a first adjustable clip 23 which is installed in first channel 21. Referring to FIG. 12 is shown a bottom view of holster 20 showing first adjustable clip 23 and second adjustable clip 24 installed respectively in the first channel 21 and the second channel 22. Referring to FIG. 13 is shown a top view of holster 20 showing first adjustable clip 23 and second adjustable clip 24 installed respectively in the first channel 21 and the second channel 22.

Figure 8:
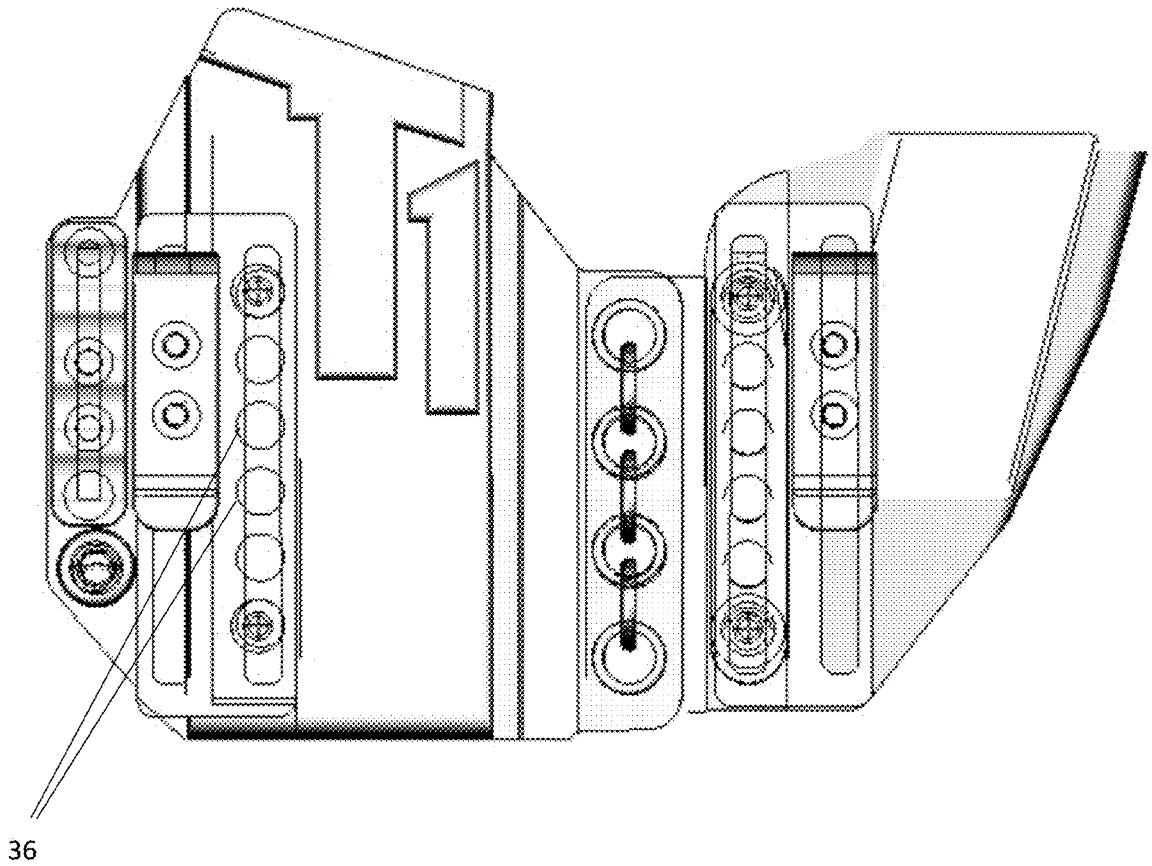
FIG. 8 is a front view of an appendix carry holster rig having an adjustable clip system shown in FIG. 1 and an adjustable torsion claw.
Figure 14:
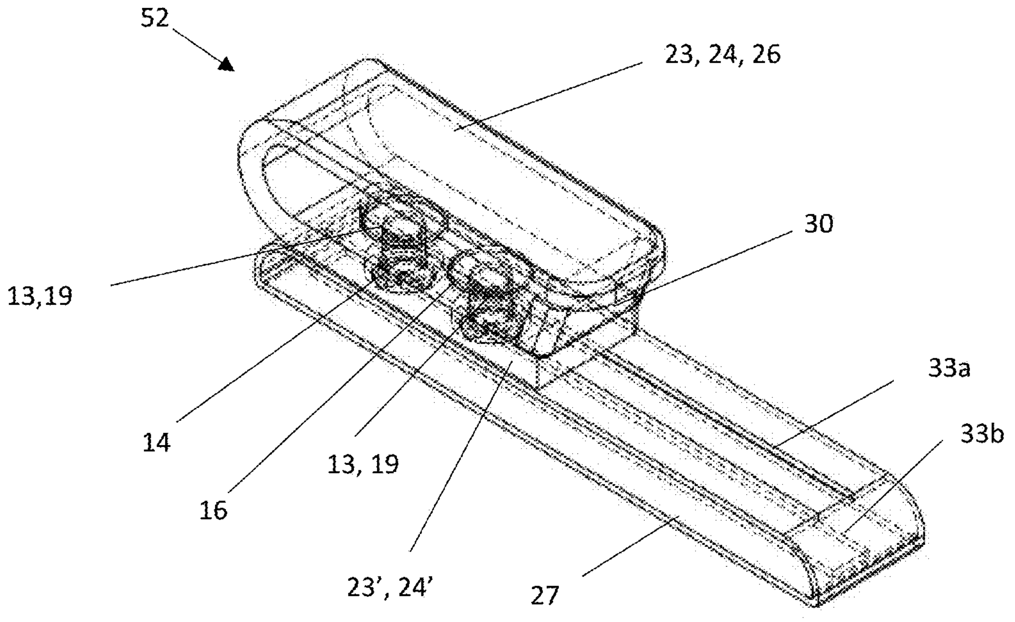
FIG. 14 is a perspective view of an alternative embodiment of the adjustable clip system having a channel bracket.
Figure 15:
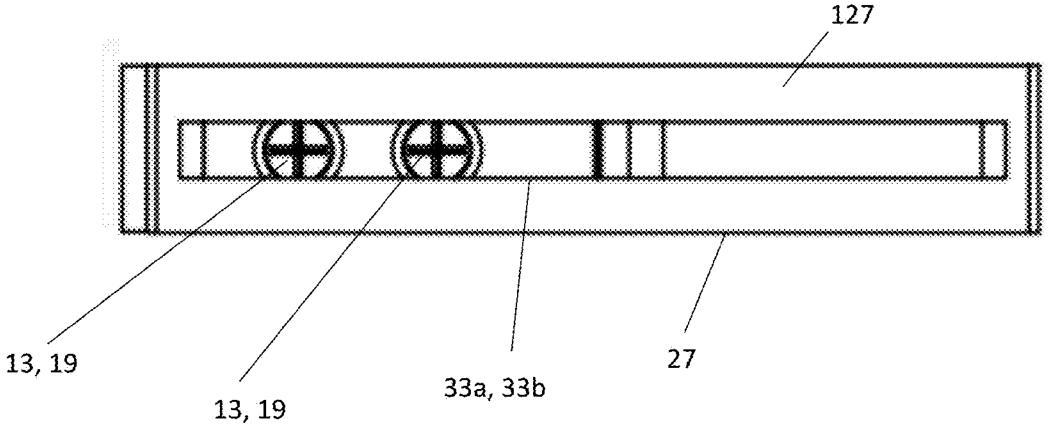
FIG. 15 is a back view of the channel bracket shown in FIG. 14.

FIG. 14 is a perspective view of an alternative embodiment of the adjustable clip system 52 including a belt clip 23, 24, 26 and a channeled member which is preferably a channel bracket 27 which engages with channels 21 and 22 shown in FIG. 9 or with holes 36 as shown in FIG. 8. Belt clip 23, 24, 26 includes a toggle latch 30. The toggle latch 30 articulates so that a belt or waistband can pass between the toggle latch 30 and mounting portions 23', 24' when a user attaches the belt clip 23, 24, 26 to the belt or waistband. The belt clip 23, 24, 26 is attached to the channel bracket 27 with stud 13, 19 which have compressible spacer 14 captured between the first stud head and the underside of slot 33*a* on channel bracket 27. A compressible spacer or spring 15 may also be disposed between a stud second head opposite the first stud head and the mounting portion 23', 24'. Belt clip 23, 24, 26 has a clip mounting opening 16 which the stud 13, 19 is enabled to fit through. The stud 13, 19 fits in upper slot 33*a* of channel bracket 27. Rivets, studs, or other fasteners are used to attach the channel bracket 27 to the holster 3, 20, 20', which extend through lower slot 33*b* and engage with channels 21 and 22 shown in FIG. 9 or with holes 36 as shown in FIG. 8. Compressible spacers 14 or springs 15 allow the belt clip 23, 24, 26 to slide in slot 33*a* on channel bracket 27. When the user applies force to the holster 3, 20, 20' that the channel bracket 27 is attached, the springs or compressible spacers 14 compress to allow the fasteners 13, 19 to slide in slot 33*a* on channel bracket 27, thereby allowing the belt clip 23, 24, 26 to be adjusted along the length of slot 33*a* in channel bracket 27. Referring to FIG. 15 is shown the channel bracket 27 viewing the surface 127 which contacts the sheath or holster 3, 20, 20'. Slot 33*a* allows sliding movement of the stud 13, 19. The channel bracket 27 is mounted to the sheath or holster 3, 20, 20'. The at least one compressible spacer remains in an expanded state when resting, thereby locking the channeled brackets and respective clips together.

Figure 16:
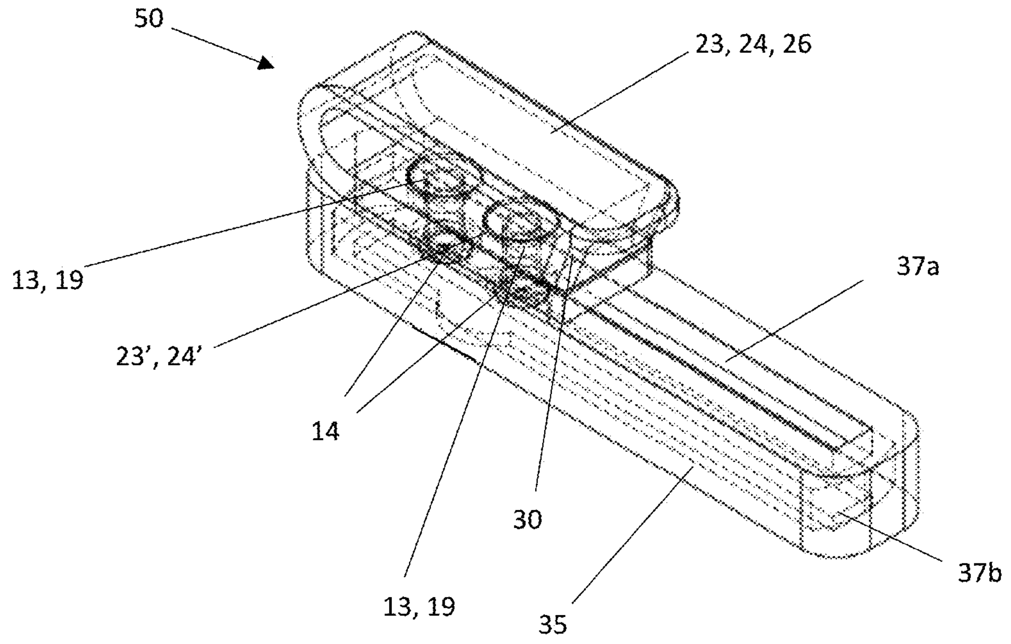
FIG. 16 is a perspective view of a second alternative embodiment of the adjustable clip system having a surface mount channel bracket.
Figure 17:
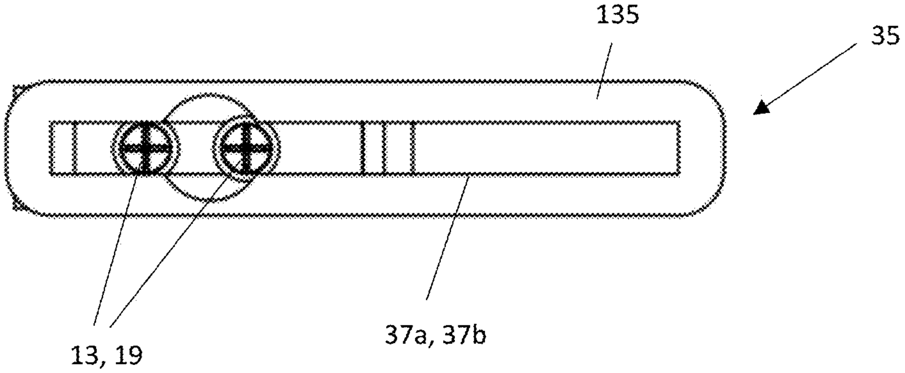
FIG. 17 is a back view of the surface mount channel bracket shown in FIG. 16.

Referring to FIG. 16 is a perspective view of an alternative adjustable clip system 50 including a belt clip 23, 24, 26 and a channeled member which is preferably a surface mount channel bracket 35 which attaches to the holster 3, 20, 20' with fasteners or stud 28, 29 through lower channel 37*b*. The channel bracket 35 is attachable to the belt clip 23, 24, 26 using studs 13, 19 with which have springs or compressible spacers 14 captured between the stud head and the base of belt clip 23, 24, 26. Clip 23, 24, 26 attaches to the surface mount channel bracket 35 through upper channel 37*a*. Compressible spacers 14 are affixed by studs 13, 19 on the underside of the top surface mount channel bracket slot 37*a* to allow clip 23, 24, 26 to slidably attach to channel bracket 35. A toggle latch 30 articulates so that a belt can pass between the toggle latch 30 and belt clip 23, 24, 26 when the toggle latch 30 is placed against the bottom edge of the belt and the belt is urged downward. Belt clip 23, 24, 26 has a clip mounting opening 16 in which the stud 13, 19 is enabled to fit through. The at least one compressible spacer remains in an expanded state when resting, thereby locking the channeled bracket and respective clips together. When the user applies force to the holster 3, 20, 20' that the surface mount channel bracket 35 is attached to, the spring or compressible spacer 14 retained by studs 13, 19 on belt clip 23, 24, 26 allows the adjustable fasteners to slide freely in surface mount channel bracket slot 37*a*, thereby allowing the holster 3, 20, 20' to be adjusted along slot 37*a*. Referring to FIG. 17 is a back view of the surface mount channel bracket 35 showing surface mount channel bracket slot 37*a*, 37*b*, studs or adjustment fasteners 13, 19, and surface 135 which contacts the sheath or holster.

Figure 18:
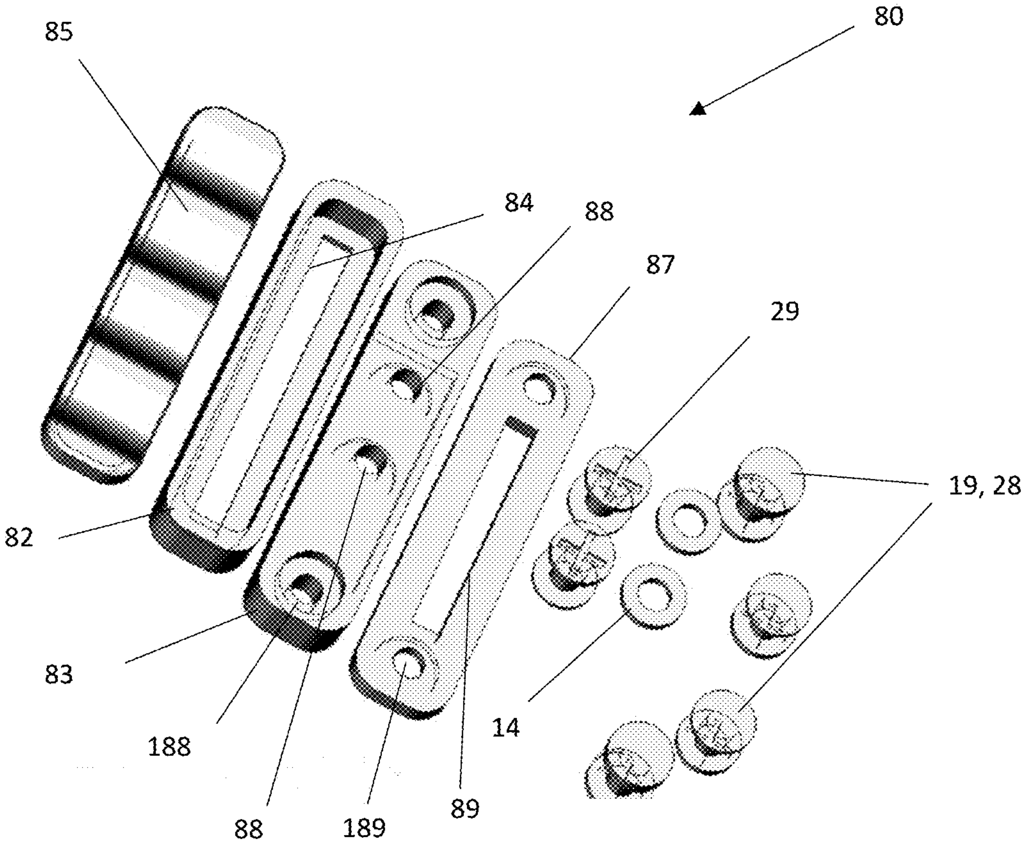
FIG. 18 is an exploded perspective view of an adjustable torsion claw or torsion claw kit shown in FIG. 8.

FIG. 18 shows an enlarged perspective view of an adjustable torsion claw 80. The adjustable torsion claw 80 reduces the impression imposed by the mass of a firearm or tool worn under clothing such as a shirt, sweater, or jacket. The impression caused by the mass of said tool or firearm is commonly referred to as "printing". The adjustable torsion claw 80 minimizes printing by torquing the firearm and/or holster 3, 20, 20' against the user's belt or garment, aligning the firearm more closely with the user's body. Adjustable torsion claw 80 accommodates for changes in height and/or position of the holster 3, 20, 20' while maintaining torsion of the sheath or holster. The adjustable torsion claw 80 includes a tooth securing bracket or torsion member 82 slidably attached to a fixed torsion bracket 83 using adjustment fasteners 19, 28 through torsion member slot 84. Fasteners 19, 28 may engage a spring or compressible washer 14 for adjusting the amount of pressure between the torsion member 82 and the torsion adjustment bracket 83. Adjustment fasteners 19, 28 urge the torsion member 82 toward the fixed torsion bracket 83 to allow the torsion member 82 to slide along the torsion bracket 83 when a sufficient pressure is applied to the torsion member 82 in an upward or a downward direction. The adjustable clip system is securable to a sheath or holster 3, 20, 20' for allowing a height of the sheath or holster 3, 20, 20' to be adjusted in relation to a fixed attachment point on a wearer. The adjustable torsion claw 80 includes the tooth securing bracket or torsion member 82 having a vertical slot 84, a tooth cap 85 having ridges or a non-slip texture on a surface thereof, the tooth cap securable to the tooth securing bracket. The adjustable torsion claw 80 includes a torsion adjustment bracket 83 wherein the tooth securing bracket or torsion member 82 slidably secures the tooth cap 85 to the torsion adjustment bracket 83 and a mounting bracket 87 for mounting the torsion adjustment bracket 83 to the sheath or holster 3, 20, 20'. The mounting bracket 87 maintains a mounting slot 89 for attaching the mounting bracket 87 to the sheath or holster 3, 20, 20'. The adjustable torsion claw system includes at least one adjustable fastener 28, preferably a threaded rivet 19, comprising a first flange having an integrated threaded cylinder protruding therefrom and a second flange engageable with the threaded cylinder. The adjustable fastener 19, 28 extends through the vertical slot 84 and at least one opening 88 in the adjustment bracket 83, for securing the tooth cap 85 to the torsion member 82. Attachment fasteners 29 secure the torsion adjustment bracket 83 to the mounting bracket 87 through the respective bracket openings 189 and torsion adjustment bracket openings 188. The attachment fasteners 29 may also be used to secure the mounting bracket 87 to the holster 3, 20, 20'. The adjustable clip system includes at least one compressible spacer 14 disposed between the first flange of the fastener and inside surface of the torsion member 82, the second flange disposed within opening 88 of the torsion adjustment bracket 83, to slidably retain torsion member 82 with the adjustable fastener head to adjust compression and resistance. Turning the adjustable head in one direction increases friction and decreases slidability while turning the adjustable head in the opposite direction decreases friction and increases slidability of the torsion member. This adjustability holds true for all embodiments of the adjustable clip system described herein. Adjustability for both fine adjustment changes due to wear of the components and user preference for handling holds true for any sliding part described herein. The threaded rivet shown in FIGS. 23A and 23B may be used in this embodiment of the adjustable torsion claw system.

The channeled member described herein may be a channeled plate 7, holster slot/channel 21, 22, a mounting bracket 27, or a surface mount channel bracket 37. Although each of the channeled members 7, 21, 22, 27, and 37 include one or more channels or slots, the channels or slots may present in different orientations or on different planes. The orientation of the channels or slots on channeled plate 7 is side-by-side. The orientation of holster slots/channels 21, 22 are vertically disposed within the holster. The channels or slots on mounting bracket 27 and surface mount channel bracket 37 present in a stacked orientation.

The use of the term "opening", "channel", or "slot" in reference to the attachment or fixed mounting of any embodiment within this disclosure herein described including channeled slot 11, lower slot 33*b*, lower channel 37*b*, or mounting slot 89 may take the form of a hole or exist on different planes or orientations. The pattern for mounting of any of the embodiments herein may be rearranged to facilitate various patterns for attachment to holsters, holster rigs, and sheaths maintaining different attachment footprints.

Adjustable clip kits may provide the components necessary to result in the clip system according to the descriptions herein and additionally include instructions for carrying out the installation of the adjustable clip kit.

Figure 19A:
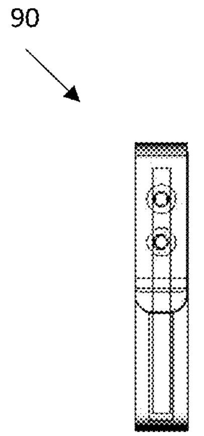
FIG. 19A is an assembled kit for an alternate embodiment of the adjustable clip system according to the first alternative embodiment of the present invention having the channel bracket.
Figure 19B:
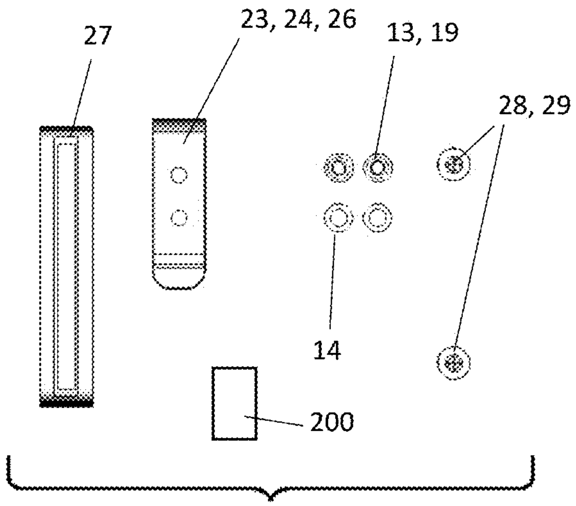
FIG. 19B is an un-assembled kit for the adjustable clip system shown assembled in FIG. 19A.

The kit 90 shown in FIGS. 19A and 19B includes one bracket 27, one clip 23, 24, 26, two compressible washers 14, two threaded rivets 13, 19, and two attachment fasteners 28, 29. The kit may alternately have fewer or more washers, threaded rivets, and/or attachment fasteners.

Figure 20A:
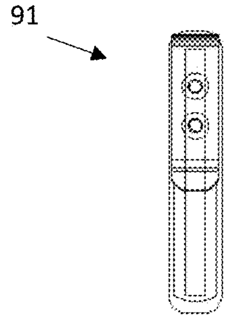
FIG. 20A shows an assembled kit for a second alternate embodiment of the adjustable clip system according to the second alternative embodiment of the present invention having the surface mount channel bracket.
Figure 20B:
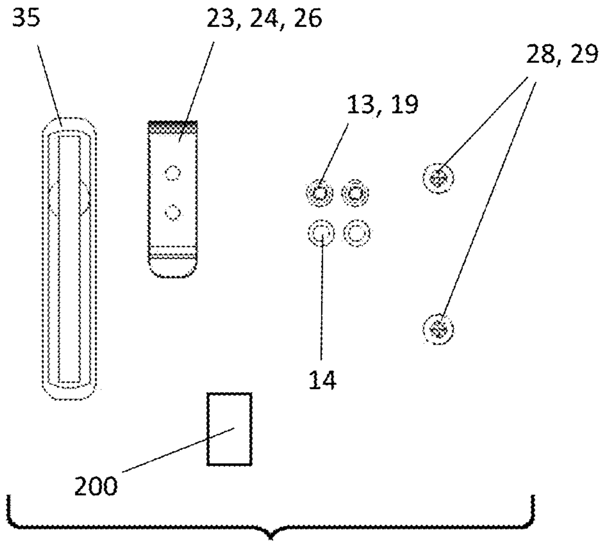
FIG. 20B is an un-assembled kit for the adjustable clip system shown assembled in FIG. 20A.

The kit 91 shown in FIGS. 20A and 20B includes one bracket 35, one clip 23, 24, 26, two compressible washers 14, two adjustable fasteners 13, 19, and two attachment fasteners 28, 29. The kit may alternately have fewer or more washers, threaded rivets, and/or attachment fasteners.

Figure 21A:
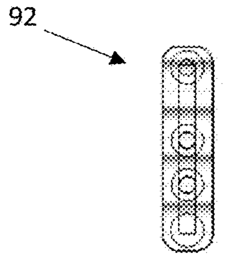
FIG. 21A shows an assembled kit for the adjustable torsion claw having the slotted channel bracket.
Figure 21B:
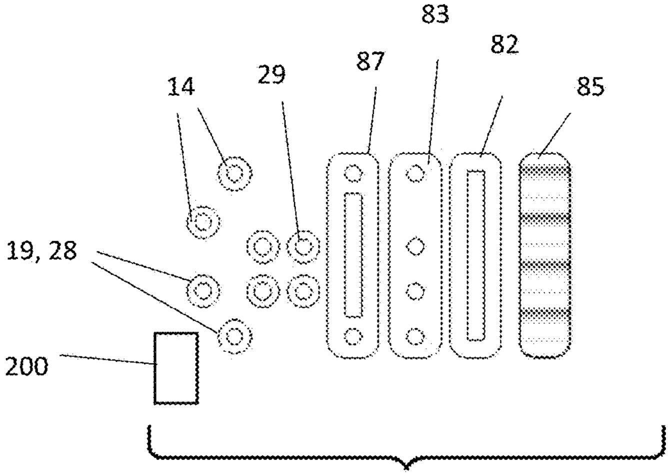
FIG. 21B is an un-assembled kit for the adjustable torsion claw shown assembled in FIG. 21A.

The kit 92 shown in FIGS. 21A and 21B includes one mounting bracket 87, one torsion adjustment bracket 83, one torsion member 82, one torsion claw cap 85, two compressible washers 14, four attachment fasteners 29, and two threaded rivets 19 or adjustment fasteners 28. The kit may alternately have fewer or more washers, threaded rivets, and/or attachment fasteners.

Figure 22A:
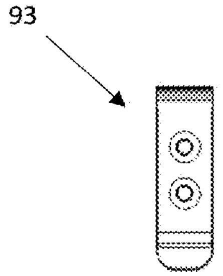
FIG. 22A shows an assembled kit for the adjustable clip system of the second embodiment having the slotted channel bracket integrated with a holster.
Figure 22B:
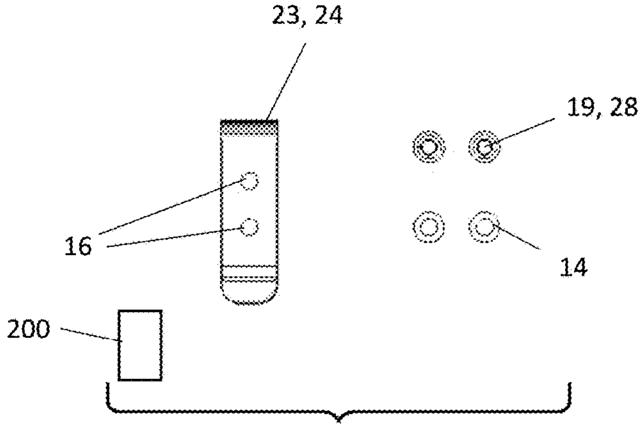
FIG. 22B is an un-assembled kit for the adjustable clip system shown assembled in FIG. 22A.

The kit 93 shown in FIGS. 22A and 22B is for use on a sheath or holster which has a slotted channel formed in the sheath or holster. The kit 93 includes at least one clip 23, 24, two compressible washers 14, and two adjustable fasteners 19, 28. The adjustable fastener may include threaded portions for engaging the adjustable fastener head, shank, and cap. The kit may alternately have fewer or more washers and/or attachment fasteners. Any of the kits 90, 91, 92, 93 described may include instructions 200 for guiding the user with installing the kit components.

An alternate kit includes one channeled plate 7, at least one clip 12, two compressible washers 14 and/or springs 15, two adjustable fasteners 13, 19, and two attachment fasteners 9, 29. The kit may alternately have fewer or more compressible washers, threaded rivets, and/or attachment fasteners.

The kit may additionally include at least one channel bracket 27 or surface mount channel bracket 35. An alternate kit may additionally include adjustable torsion claw 80. The attachment fastener 28, 29 may secure the channel bracket 27 to the holster. The attachment fastener 28, 29 may be a rivet, threaded rivet, screw, or any fastener which may be used to secure the channel bracket 27 or the surface mount channel bracket 35 to the holster 3, 20, 20' without adjustments required after the initial set up of the clip system.

The assembly of all the items into a kit makes the installation simple and easy for the user. All parts that are necessary for installing the adjustable attachment for the holster or holster rig are included in the kit. A kit may comprise:

a. at least one channeled plate 7 or at least one channel bracket 27 or surface mount channel bracket 35;
b. at least one stud 9, 13, 19, or 28;
c. at least one compressible spacer 14 or spring 15;
d. at least one attachment fastener 28, 29; and
e. at least one clip 23, 24, 26.

Figure 25:
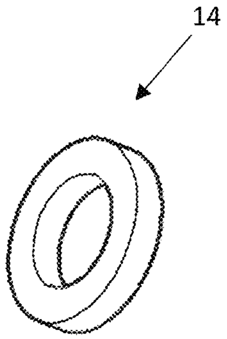
FIG. 25 shows a compressible washer according to the present invention.

FIGS. 23A and 23B show a threaded rivet 19, 28 comprising a first flange 19*b* having an integrated threaded cylinder 19*c* protruding therefrom and a second flange 19*a* engageable with the threaded cylinder 19*c*. As shown in FIG. 24, a non-removable rivet 29 includes a first flange 29*b* integrated with a cylindrical shank or shaft 29*c*. The cylindrical shaft has a formable portion at the end of the shaft 29*c* opposite the first flange 29*b* which is pressed outward into the second flange 29*a*. FIG. 25 shows one embodiment of the compressible spacer 14 and may be any resilient material which allows compression.

Another aspect of the present invention as best seen in FIGS. 9-13 and FIGS. 23A, 23B and 25 is directed to a method for installing an adjustable clip system securable to a holster 20 for allowing a height of the holster 20 to be adjusted in relation to a fixed attachment point on a wearer. The method includes providing the holster 20 and ensuring the holster 20 has an elongated slot 21, 22 disposed vertically on a portion of the holster 20. The method includes providing a U-shaped clip 23, 24, the U-shaped clip 23, 24 having a mounting portion 23', 24' with at least one clip mounting opening 16 (FIG. 22B). The method includes providing a threaded rivet or adjustment fastener 19, 28 as shown in FIGS. 23A and 23B, having a stud portion 19*c* with a first stud end and a second stud end opposite the first stud end. The adjustment fastener 28 or threaded rivet 19 has a head portion 19*a* removably attachable to the stud first end and a base portion 19*b* attached to the stud second end. The method includes providing a compressible spacer 14, ensuring the fastener head 19*a* has been removed from the fastener stud 19*c* and extending the first end of the fastener stud 19*c* through the compressible spacer 14 until the fastener base portion 19*b* contacts the compressible spacer 14. The method includes extending the first end of the fastener stud 19*c* through the holster slot 21, 22 until the compressible spacer 14 contacts the holster 20, extending the first end of the fastener stud 19*c* through the clip mounting opening 16 and engaging the fastener head portion 19*a* to the first stud end. The method includes tightening the fastener head portion 19*a* onto the stud first end, securing the U-shaped clip 23, 24 to the wearer's belt or waistband, and adjusting the holster 20 in an upward or downward direction. The fastener head can be adjusted to increase or decrease compression and drag to add or reduce resistance for sliding of the stud and clip along the slotted channel. In an alternate method, the steps which include engagement of the fastener may be reversed wherein the engagement steps include ensuring the fastener head has been removed from the fastener stud 19*c*, extending the first end of the fastener stud through the clip mounting opening until the second end of the stud contacts the base of the u-shaped clip, extending the first end of the fastener stud through the slot in the holster, extending the first end of the stud through the compressible spacer, and engaging the fastener head with the stud portion of the fastener. The fastener head can be adjusted to increase or decrease compression and drag to add or reduce resistance for sliding of the stud and clip along the slotted channel. The user may then don the holster by attaching the U-shaped clips to the user's desired attachment point and adjust the holster up or down along the length of the vertical slots to the functional position of comfort. The holster 20 may be a holster rig. The holster 20 may be a sheath. In an alternate embodiment a kit 93 includes the U-shaped clip 23, 24, the fastener 19, 28, the compressible washer 14, and a set of instruction 200 for implementing the method for installing the adjustable clip system.

An electronic module 70 as shown in FIG. 10B may be mounted to a portion of the holster or adjustable clip system in order to automate adjustment of the fasteners and/or compression washers or springs to increase or decrease resistance of the adjustable clip system and/or adjustable torsion claw. The electronic module may also be used to trigger an actuator, sensor, and/or transducer to adjust the height of the clip along the channeled member and/or retention of the clips and/or weapon/tool being carried. The electronic module may be equipped with a wireless device and may be controlled through technology including but not limited to a Bluetooth module via cellphone or other electronic device. The controls include but are not limited to locking/retention features for the holster or adjustable clip system, sensors for measuring position and compressive force, communication with actuators, sensors, and transducers for the automated movement of the clips and/or channeled members, and the delivery of error messages or other technical information. User data may be obtained for the purpose of but not limited to diagnostics, feedback, and troubleshooting.

The term "rubber washer" and "rubber spacer" may be used interchangeably in the above description. The reference to the washer or spacer being rubber may be literal where the washer or spacer is made from a natural or synthetic rubber material. The reference to the washer or spacer being rubber may alternately mean a material which is compressible, from being highly compressible to being closer to resilient.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An adjustable clip system securable to a sheath or a holster for allowing a height of the sheath or the holster to be adjusted in relation to a fixed attachment point on a wearer, the adjustable clip system comprising:

a channeled member having a first opening and a second opening adjacent to the first opening wherein the channeled member is attachable to the sheath or the holster;

at least one compressible spacer and at least one adjustment fastener;

at least one attachment fastener extending through the first opening and secured to an opening in the sheath or the holster for securing the channeled member to the sheath or the holster; and at least one U-shaped clip being slidably attached to the second opening to allow the U-shaped clip to slide in an upward direction and a downward direction in relation to at least one first opening, the U-shaped clip remaining stationary with respect to the wearer wherein the at least one adjustment fastener extends through an opening in the U-shaped clip and through the compressible spacer.

2. The adjustable clip system of claim 1 wherein the channeled member is a channel bracket.

3. The adjustable clip system of claim 1 wherein the channeled member is a surface mount channel bracket.

4. The adjustable clip system of claim 1 wherein the holster is a holster rig.

5. The adjustable clip system of claim 1 wherein the channeled member is adjustably attachable to the sheath or the holster.

6. The adjustable clip system of claim 1 wherein the at least one adjustment fastener is at least one stud retaining the at least one compressible spacer for slidably attaching the U-shaped clip to the second opening.

7. The adjustable clip system of claim 1 wherein the openings in the channeled member may be vertical channels.

8. The adjustable clip system of claim 6 wherein the at least one stud is a rivet having a first flange on a first rivet end integrated with a threaded cylinder and a second flange disposed on a second rivet end opposite the first rivet end, the second flange engageable with the threaded cylinder.

9. The adjustable clip system of claim 6 wherein the at least one compressible spacer is a spring.

10. The adjustable clip system of claim 6 wherein the at least one compressible spacer is a rubber washer.

11. The adjustable clip system of claim 1 wherein the channeled member includes locking notches, textured surfaces, or non-slip ridges for controlling slidability of the clip along the second opening.

12. An adjustable clip kit for mounting the sheath or the holster to the fixed attachment point on the wearer using the adjustable clip system according to claim 1, the adjustable clip kit comprising:

the channeled plate member;

the at least one U-shaped clip;

the at least one adjustment fastener;

the at least one attachment fastener;

the at least one compressible spacer; and a set of instructions for using the adjustable clip kit.

13. The adjustable clip kit according to claim 12 wherein the at least one adjustment fastener is an adjustable stud.

14. The adjustable clip kit of claim 12 wherein the at least one attachment fastener is for attaching the channel member to the sheath or holster.

15. The kit of claim 12 wherein the attachment fasteners are screws or rivets.

16. An adjustable clip system securable to a sheath or holster for allowing a height of the sheath or holster to be adjusted in relation to a fixed attachment point on a wearer, said adjustable clip system comprising:

an adjustable torsion claw including:

a tooth securing bracket having a vertical slot;

a tooth cap having ridges or a non-slip texture on a surface thereof, the tooth cap securable to the tooth securing bracket;

a torsion adjustment bracket wherein the tooth securing bracket slidably secures the tooth cap to the torsion adjustment bracket;

a mounting bracket for mounting the torsion adjustment bracket to the sheath or holster;

at least one fastener comprising a first flange having an integrated threaded cylinder protruding therefrom and a second flange engageable with the threaded cylinder, the fastener extending through said vertical slot in the tooth securing bracket and at least one opening in the torsion adjustment bracket, for slidingly securing the tooth cap to the torsion adjustment bracket;

at least one compressible spacer disposed between the first flange of the fastener and tooth securing bracket to slidably attach the tooth securing bracket to the torsion adjustment bracket, the second flange disposed against an inside surface of the torsion adjustment bracket;

at least one additional fastener with a first additional fastener flange disposed between an opening in the torsion adjustment bracket and a second additional fastener flange disposed against the mounting bracket for retaining the torsion adjustment bracket to the mounting bracket; and at least one additional fastener with a first additional fastener flange disposed between an opening in the mounting bracket and a second additional fastener flange disposed against the holster for retaining the adjustable torsion claw to the holster.

17. A method for installing an adjustable clip system securable to a holster for allowing a height of the holster to be adjusted in relation to a fixed attachment point on a wearer, the method comprising;

providing the holster;

ensuring the holster has an elongated slot disposed vertically on a portion of the holster;

providing a U-shaped clip, the U-shaped clip having a mounting portion with a clip mounting opening;

providing a fastener comprising a stud portion having a first stud end and a second stud end opposite the first stud end, the fastener including a head portion removably attachable to the stud first end and a base portion attached to the stud second end;

providing a compressible spacer;

ensuring the fastener head portion is removed from the fastener stud;

attaching the clip to the holster along the holster slot by:

extending the first end of the fastener stud through the compressible spacer until the fastener base portion contacts the compressible spacer, extending the first end of the fastener stud through the holster slot until the compressible spacer contacts the holster, and extending the first end of the fastener stud through the clip mounting opening; or extending first end of the fastener stud through the clip mounting opening until the second end of the stud contacts the base of the U-shaped clip, extending the first end of the fastener stud through the slot in the holster, and extending the first end of the stud through the compressible spacer; and engaging the fastener head to the first stud end;

adjusting the fastener head to adjust resistance for sliding the clip along the elongated slot;

securing the U-shaped clip to the fixed attachment point on the wearer; and adjusting the holster in an upward or downward direction.

18. The method according to claim 17 wherein the holster is a holster rig or a sheath.

19. A kit for implementing the method according to claim 17, the kit including:

the U-shaped clip;

the fastener;

the compressible spacer; and a set of instruction for implementing the method for installing the adjustable clip system.

20. The kit according to claim 19 wherein the kit includes the holster having the slotted channel.

* * * * *